US009088396B2

(12) United States Patent
Yoon et al.

(10) Patent No.: US 9,088,396 B2
(45) Date of Patent: Jul. 21, 2015

(54) APPARATUS AND METHOD FOR TRANSMITTING MUTING INFORMATION, AND APPARATUS AND METHOD FOR ACQUIRING CHANNEL STATE USING SAME

(71) Applicant: Pantech Co., Ltd., Seoul (KR)

(72) Inventors: Sungjun Yoon, Seoul (KR); Kyoungmin Park, Seoul (KR); Sungjin Suh, Seoul (KR)

(73) Assignee: Pantech Co., Ltd., Seoul (KR)

( * ) Notice: Subject to any disclaimer, the term of this patent is extended or adjusted under 35 U.S.C. 154(b) by 0 days.

(21) Appl. No.: 14/547,112

(22) Filed: Nov. 18, 2014

(65) Prior Publication Data

US 2015/0071241 A1    Mar. 12, 2015

Related U.S. Application Data

(63) Continuation of application No. 13/816,182, filed as application No. PCT/KR2011/005919 on Aug. 11, 2011, now Pat. No. 8,897,182.

(30) Foreign Application Priority Data

| Aug. 11, 2010 | (KR) | 10-2010-0077590 |
| Aug. 13, 2010 | (KR) | 10-2010-0078536 |
| Oct. 7, 2010 | (KR) | 10-2010-0098005 |
| Oct. 7, 2010 | (KR) | 10-2010-0098006 |

(51) Int. Cl.
*H04W 4/00*       (2009.01)
*H04J 4/00*       (2006.01)
(Continued)

(52) U.S. Cl.
CPC .................................... *H04L 5/0048* (2013.01)

(58) Field of Classification Search
CPC .............. H04W 24/02; H04W 28/048; H04W 28/0236; H04W 36/20; H04W 36/30; H04W 52/02; H04W 52/143; H04W 52/146; H04W 52/243; H04W 52/244; H04W 52/367; H04W 72/0406; H04W 72/0446; H04W 72/0453; H04W 72/082; H04W 72/085; H04W 76/048; H04W 84/12; Y02B 60/50; H04L 1/0001; H04L 1/0693; H04L 5/0007; H04L 5/0035; H04L 5/0048; H04L 5/0051; H04L 5/0057; H04L 5/0073; H04L 5/0098; H04L 25/0226; H04L 27/2613; H04B 1/7103; H04B 7/024; H04B 7/0413; H04B 7/0452; H04B 7/0626; H04B 7/0632; H04B 15/00; H04J 11/0023; H04J 11/005
USPC ......... 370/204–209, 252, 286–292, 310–350, 370/431–444, 464, 478–480; 455/62, 63.1, 455/67.13, 114.2, 222, 278.1, 296, 501; 375/144, 148, 254, 278, 284–285, 296, 375/346, 348, 367; 709/223–229
See application file for complete search history.

(56) References Cited

U.S. PATENT DOCUMENTS

| 8,208,434 B2 * | 6/2012 | Sayana et al. .................. 370/329 |
| 8,472,539 B2 * | 6/2013 | Ko et al. ....................... 375/260 |

(Continued)

FOREIGN PATENT DOCUMENTS

| EP | 2605433 | 6/2013 |
| JP | 2008-533904 | 8/2008 |
| WO | 2010/074504 | 7/2010 |

OTHER PUBLICATIONS

International Search Report issued on Mar. 26, 2012 in International Application No. PCT/KR2011/005919.

(Continued)

*Primary Examiner* — Tri H Phan
(74) *Attorney, Agent, or Firm* — H.C. Park & Associates, PLC

(57) ABSTRACT

The present disclosure relates to an apparatus and a method for transmitting muting information in a wireless communication system, and to an apparatus and a method for acquiring channel state using same. In an exemplary embodiment, muting information includes: a first data field, having a serving cell for receiving from peripheral cells in a multi-cell environment, at least one of a CSI-RS pattern, the number of CSI-RS antenna ports, a CSI-RS duty cycle, and CSI-RS transmission subframe offset information, and using same for expressing the cycle and the offset of muting subframes, which pertain to information on a resource block that can generate interference between the peripheral cells and CSI-RS; and a second data field for expressing a specific muting pattern, which must be muted within the muting subframes, having either 12 bits or 28 bits that display muting application in a bitmap format.

6 Claims, 24 Drawing Sheets

(51) Int. Cl.
*H04J 3/16* (2006.01)
*H04L 5/00* (2006.01)

(56) References Cited

U.S. PATENT DOCUMENTS

| | | | |
|---|---|---|---|
| 8,537,911 | B2 | 9/2013 | Sayana et al. |
| 8,619,693 | B2 * | 12/2013 | Noh et al. ............ 370/329 |
| 8,665,972 | B2 | 3/2014 | Kim et al. |
| 8,767,610 | B2 * | 7/2014 | Kim et al. ............ 370/315 |
| 8,897,182 | B2 * | 11/2014 | Yoon et al. ............ 370/286 |
| 2008/0039129 | A1 | 2/2008 | Li et al. |
| 2008/0125124 | A1 | 5/2008 | Craig |
| 2010/0195615 | A1 | 8/2010 | Lee et al. |
| 2011/0235743 | A1 | 9/2011 | Lee et al. |
| 2012/0039282 | A1 | 2/2012 | Kim et al. |
| 2012/0076106 | A1 | 3/2012 | Bhattad et al. |
| 2012/0113961 | A1 | 5/2012 | Krishnamurthy |
| 2012/0315859 | A1 | 12/2012 | Lee et al. |
| 2013/0094384 | A1 * | 4/2013 | Park et al. ............ 370/252 |
| 2013/0258976 | A1 | 10/2013 | Nagata et al. |
| 2014/0185527 | A1 | 7/2014 | Kim et al. |

OTHER PUBLICATIONS

Notice of Allowance issued on Jul. 23, 2014 in U.S. Appl. No. 13/816,182.

* cited by examiner

FIG.3

<NUMBER OF CSI-RS ANTENNA PORTS IS 8>

FIG.4

<NUMBER OF CSI-RS ANTENNA PORTS IS 4>

FIG.5

<NUMBER OF CSI-RS ANTENNA PORTS IS 2>

FIG. 7

<NUMBER OF CSI-RS ANTENNA PORTS IS 8>

FIG.8

<NUMBER OF CSI-RS ANTENNA PORTS IS 4>

FIG.9

<NUMBER OF CSI-RS ANTENNA PORTS IS 2>

| | | | 0i | 1i | | | | | |
|---|---|---|---|---|---|---|---|---|---|
| | | | | | | | | 0a | 1a |
| | | | 0j | 1j | | | | 0b | 1b |
| | | | 0k | 1k | | | | | |
| | | | | | | | | 0c | 1c |
| | | | 0l | 1l | | | | 0d | 1d |
| | | | 0m | 1m | | | | | |
| | | | | | | | | 0e | 1e |
| | | | 0n | 1n | | | | 0f | 1f |
| | | | 0o | 1o | | | | | |
| | | | | | | | | 0g | 1g |
| | | | 0p | 1p | | | | 0h | 1h |

<NUMBER OF CSI-RS ANTENNA PORTS IS 8>

FIG.13

<NUMBER OF CSI-RS ANTENNA PORTS IS 8>

| | | | | | | | | | | |
|---|---|---|---|---|---|---|---|---|---|---|
| | | | 0f | 1f | | 0c | 1c | | | |
| | | | | | | 0d | 1d | | 0a | 1a |
| | | | 0g | 1g | | 0e | 1e | | 0b | 1b |
| | | | 2f | 3f | | 2c | 3c | | | |
| | | | | | | 2d | 3d | | 2a | 3a |
| | | | 2g | 3g | | 2e | 3e | | 2b | 3b |
| | | | 4f | 5f | | 4c | 5c | | | |
| | | | | | | 4d | 5d | | 4a | 5a |
| | | | 4g | 5g | | 4e | 5e | | 4b | 5b |
| | | | 6f | 7f | | 6c | 7c | | | |
| | | | | | | 6d | 7d | | 6a | 7a |
| | | | 6g | 7g | | 6e | 7e | | 6b | 7b |

FIG.19

| 1 | 0 | 1 | 0 | 1 | 0 | 0 | 0 | 0 | 0 | 0 | 1 |

APPARATUS AND METHOD FOR TRANSMITTING MUTING INFORMATION, AND APPARATUS AND METHOD FOR ACQUIRING CHANNEL STATE USING SAME

CROSS-REFERENCE TO RELATED APPLICATIONS

This application is a continuation of U.S. patent application Ser. No. 13/816,182, filed on Feb. 8, 2013, which is the National Stage Entry of International Application No. PCT/KR2011/005919, filed on Aug. 11, 2011, and claims priority from and the benefit of Korean Patent Application No. 10-2010-0077590, filed on Aug. 11, 2010, Korean Patent Application No. 10-2010-0078536, filed on Aug. 13, 2010, Korean Patent Application No. 10-2010-0098005, filed on Oct. 7, 2010, and Korean Patent Application No. 10-2010-0098006, filed on Oct. 7, 2010 all of which are incorporated herein by reference as if fully set forth herein.

BACKGROUND

1. Field

The embodiment of the present invention relates generally to a wireless communication system, and specifically to a method and an apparatus for performing muting for all or a partial resource region in a resource space (PDSCH, Physical Downlink Shared Channel) for data transmission of a serving cell so as to avoid interference from a neighboring cell at the time of allocating a resource of a channel state information-reference signal (hereinafter referred to as "CSI-RS") in a wireless communication system, and using muting information for muting.

2. Discussion of the Background

As a communication system develops, consumers such as enterprises and individuals come to use a wide variety of wireless user equipments.

The current mobile communication system takes an advance from a service mainly devoted to a sound to a communication system with high speed and a large capacity that can transmit/receive various data such as videos, wireless data. A technical development for transmitting data with a large capacity equivalent to a wired communication network is in demand, and a proper method for detecting an error which can improve system performance by minimizing the decrease in information loss and increasing the efficiency in system transmission becomes an essential element.

In addition, in various current communications system, various reference signals have been used for providing a counterpart apparatus with information on a communication circumstance or the like, through uplink and downlink.

For example, in an LTE system, which is one of a mobile communication method, a reference signal or a CRS (Cell-specific Reference Signal), which is a reference signal, is transmitted per subframe for identifying channel information at the time of downlink transmission.

At this point, a CRS is differently allocated and transmitted according to time/frequency with respect to each 4 antennas, according to 4, which is the maximum number of antenna ports supported at downlink of an LTE system.

A next generation communication technology under development such as LTE-A may support up to 8 antennas for downlink. Accordingly, a CRS which is currently defined only for 4 antennas has a limit for identifying channel information at the time of downlink transmission. Therefore, a reference signal, called as a CSI-RS (Channel State Information-Reference Signal; hereinafter referred to as 'CSI-RS'), has been newly defined for identifying channel state information for up to 8 antennas.

In other words, a communication system using up to 8×8 multiple-input multiple-output (MIMO) antennas for both the transmitter and the receiver is under discussion. Further, a user equipment should transmit different CSI-RSs per respective antenna ports or layers receiving/transmitting signals. However, while a basic definition and overhead for a CSI-RS are currently being defined, a method for allocating and transmitting a corresponding CSI-RS pattern to each resource region per antenna/base station (cell) and transmitting the corresponding CSI-RS pattern has not yet been specifically defined.

Especially, in a communicating environment where one user equipment should receive CSI-RSs from various base stations or cells, it is likely that intervention between CSI-RSs from different neighboring cells will occur. Therefore, this situation should also be considered.

SUMMARY

An aspect of the present invention is to provide an apparatus and a method for transmitting and receiving CSI-RSs by allocating the CSI-RS to time-frequency resource region per antenna ports.

Another aspect of the present invention is to provide a technology of muting so that data is not transmitted to a CSI-RS allocate resource region of another cell when resources of CSI-RSs are allocated for each cell.

Another aspect of the present invention is to provide a technology for transmitting and receiving muting information by generating the muting information indicating a data muting region at the time of transmitting CSI-RSs.

Another aspect of the present invention is to provide a technology for transmitting and receiving muting information by generating the muting information indicating a muting region to which data is not allocated at the time of resource allocation of the corresponding cell in consideration of one or more of a CSI-RS pattern, the number of CSI-RS antenna ports, a CSI-RS transmission cycle (duty cycle), CSI-RS transmission subframe offset information of a neighboring cell.

Another aspect of the present invention is to provide a technology for transmitting muting information, and transmitting and receiving CSI-RSs based on the muting information by allocating resources of the CSI-RS so that data is not transmitted to the muting region.

Another aspect of the present invention is to provide a technology for estimating and acquiring a channel state by receiving muting information, and performing decoding in consideration of a muting region based on the muting information.

TECHNICAL SOLUTION

In accordance with an aspect of the present invention, there is provided a method for transmitting muting information reflecting CSI-RS intervention of a neighboring cell by a specific cell in a multicell environment, the method including: receiving CSI-RS information of the neighboring cell including one or more of a CSI-RS pattern, the number of CSI-RS antenna ports, a CSI-RS transmission cycle (duty cycle), and CSI-RS transmission subframe offset information, from the neighboring cell; determining a muting region which is a time/frequency resource region that overlaps with CSI-RSs of the neighboring cell and therefore requires muting based on the CSI-RS information of the neighboring cell; generating the muting information including a first data field that indicates a cycle and an offset of muting subframes, each of which includes the muting region, and a second data field that indicates a specific muting pattern in which muting is to be performed in the muting subframes and has one bit number among 12 bits to 28 bits, which indicates, in a bitmap format, whether to apply muting, and transmitting the generated muting information to the user equipment.

In addition, in accordance with another aspect of the present invention, there is provided a method for acquiring a channel state of each cell after receiving CSI-RSs from two or more cells by a receiver, the method including: receiving muting information including a first data field that indicates a cycle and an offset of muting subframes from a serving cell out of two or more cells and a second data field that indicates a specific muting pattern in which muting is to be performed in the muting subframes and has one bit number among 12 bits to 28 bits, which indicates, in a bitmap format, whether to apply muting; receiving CSI-RSs of the neighboring cell transmitted from a resource region of a neighboring cell corresponding to a partial region muted based on the muting information in a resource space for transmitting CSI-RSs of the serving cell and data of the serving cell; identifying a muting region in a resource space for transmitting data of the serving cell using the muting information and identifying a region for transmitting CSI-RSs of a neighboring cell corresponding thereto; and acquiring a channel state by decoding CSI-RSs of the serving cell and the neighboring cell considering the muting region.

In addition, in accordance with another aspect of the present invention, there is provided an apparatus for transmitting CSI-RS muting information, including: a neighboring cell information receiver that receives, from one or more neighboring cells in a multicell environment, CSI-RS information of the neighboring cells including at least one of CSI-RS patterns, the number of CSI-RS antenna ports, CSI-RS transmission cycles (Duty Cycle), and CSI-RS transmission subframe offset information; a muting region determining unit that determines a muting region which is a time/frequency resource region that overlaps with CSI-RSs of the neighboring cell and therefore requires muting in a resource space for transmitting data of a serving cell based on the CSI-RS information of the neighboring cell; a muting information generating unit that generates muting information including a first data field which indicates the muting region and indicates a cycle and an offset of muting subframes and a second data field which indicates a specific muting pattern to be muted in the muting subframes and has one bit number among 12 bits to 28 bits, which indicates, in a bitmap format, whether to apply muting; and a muting information transmitter that transmits the generated muting information to a user equipment (UE).

In addition, in accordance with another aspect of the present invention, there is provided an apparatus for acquiring a channel state, the apparatus including: a muting information receiver that receives muting information including a first data field that indicates a cycle and an offset of muting subframes from a serving cell out of two or more cells and a second data field that indicates a specific muting pattern in which muting is to be performed in the muting subframes and has one bit number among 12 bits to 28 bits, which indicates, in a bitmap format, whether to apply muting; a CSI-RS receiver that receives CSI-RS signals of the neighboring cell transmitted from a resource region of a neighboring cell corresponding to a partial region muted based on the muting information in a resource space for transmitting CSI-RSs of the serving cell and data of the serving cell; a muting region identifying unit that identifies a muting region in a resource space for transmitting data of the serving cell using the muting information and identifies a resource region for transmitting CSI-RSs of a neighboring cell corresponding thereto; and a channel state acquiring unit that acquires a channel state by decoding CSI-RS signals of the serving cell and the neighboring cell considering the muting region.

BRIEF DESCRIPTION OF THE DRAWINGS

FIGS. 2 to 13 illustrate representative examples for mapping CSI-RSs to one subframe.

FIGS. 2 to 5 illustrate CSI-RS patterns which are basically applied to all of FS1 (FDD) and FS2 (TDD) and which are for the case of a normal CP.

FIGS. 6 to 9 illustrate CSI-RS patterns which are basically applied to all of FS1 (FDD) and FS2 (TDD) and which are for the case of an extended CP.

FIGS. 10 to 13 illustrate examples of CSI-RS patterns applied to FS2 (TDD) as additional options.

FIGS. 10 and 11 are cases of normal CPs, and

FIGS. 12 and 13 are cases of extended CPs;

FIG. 19 illustrates an example of a data format of muting information according to the present embodiment;

DETAILED DESCRIPTION OF THE ILLUSTRATED EMBODIMENTS

Figure 1:
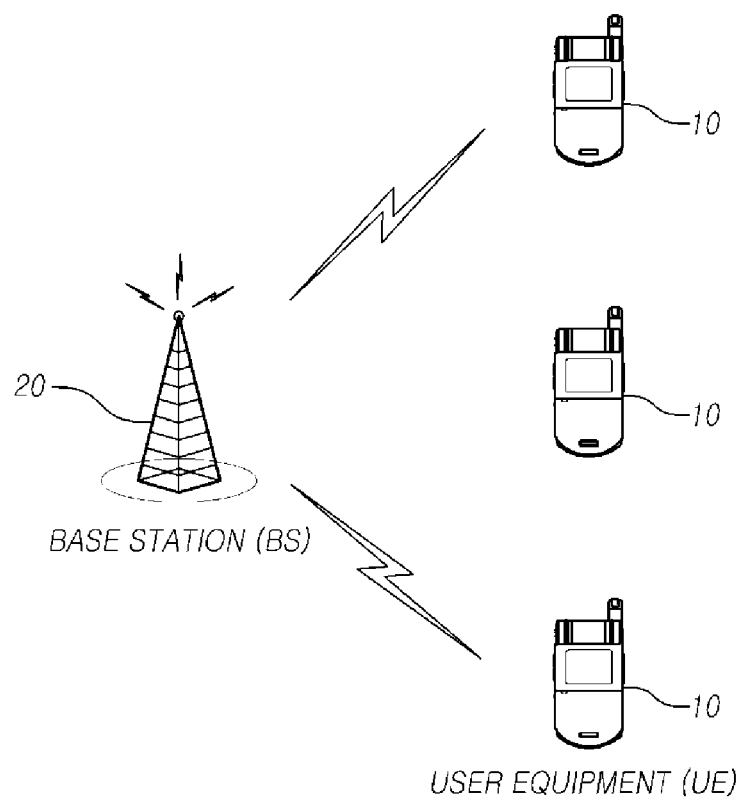
FIG. 1 is a diagram schematically illustrating a wireless communication system to which an embodiment of the present invention is applied.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a diagram illustrating a wireless communication system to which an embodiment of the present invention is applied.

The wireless communication system provides various communication services such as voice data, packet data, and the like.

Referring to FIG. 1, the wireless communication system may include a User Equipment (UE) 10 (hereinafter referred to as a "UE") and a base station 20 (Evolved-Node-B; hereinafter referred to as an "eNodeB"). The UE 10 and the eNodeB 20 may use a muting information generation technology and a channel state acquiring technology using thereof as described below, and the muting information generation technology and the channel state acquiring technology will be described below with reference to FIG. 2.

The UE 10 in the present disclosure may be a term including an MS (Mobile Station), a UT (User Terminal), an SS (Subscriber Station), a wireless device and the like.

The eNodeB or a cell may refer to a fixed station where communication with the UE is performed, and may also be referred to as a Node-B, a sector, a site, a BTS (Base Transceiver System), an access point, a relay node, and the like.

The eNodeB may be construed as an inclusive concept indicating a portion of an area or a function covered by a BSC (Base Station Controller) in CDMA, a radio network controller (RNC) in WCDMA, and the like. Further, the concept may include various coverage areas, such as a megacell, a macrocell, a microcell, a picocell, a femtocell, and a relay node communication range.

In the present disclosure, uplink transmission and downlink transmission in the eNodeB may be performed based on a Time Division Duplex (TDD) scheme that performs transmission based on different times, or based on a Frequency Division Duplex (FDD) scheme that performs transmission based on different frequencies.

An embodiment of the present invention is described for an example of a wireless communication system, which may be applicable to resource allocation in an asynchronous wireless communication scheme that evolves through GSM, WCDMA, and HSPA, to LTE (Long Term Evolution) and LTE-advanced, and may be applicable to resource allocation in a synchronous wireless communication scheme that evolves to CDMA, CDMA-2000, and UMB. The present invention may not be limited or restricted to a specific wireless communication scheme, and may include all technical fields to which a technical idea of the present invention is applicable.

The wireless communication system to which the embodiments of the present invention are applied may support an uplink and/or downlink HARQ and may use a CQI (channel quality indicator) for link adaptation. In addition, multiple access systems for transmitting downlink and uplink may be different from each other. For example, a multiple access system for downlink may use OFDMA (Orthogonal Frequency Division Multiple Access) and a multiple access system for the uplink may use SC-FDMA (Single Carrier-Frequency Division Multiple Access).

Meanwhile, in an example of a wireless communication system to which an embodiment of the present invention is applied, a radio or radio frame is configured by ten subframes and a subframe may include two slots.

A basic unit for data transmission is a unit of subframe, and downlink or uplink scheduling is performed in a unit of subframe. One slot may include a plurality of OFDM symbols in a time region.

For example, a subframe is configured by two time slots, and each time slot may include seven or six OFDM symbols in a time region.

In this manner, a time-frequency region defined as 12 subcarriers (subcarriers or subcarriers) corresponding to one slot in a time region or 180 KHz in a frequency region may be called a resource block (RB).

General structures of a subframe and a time slot of transmission data applicable to an embodiment of the present invention is described as follows.

In 3GPP LTE or the like, time for transmitting a frame is divided by a TTI (Transmission Time Interval) with a duration time of 1.0 ms. The terms, "TTI" and "sub-frame" may mean the same, and a frame is 10 ms long, and includes 10 TTIs.

As described above, a TTI is a basic transmission unit. One TTI includes two time-slots of the same length and each time-slot has a duration time of 0.5 ms. The time-slot includes 7 (or 6) long blocks (LBs) for a symbol. An LB is divided into cyclic prefixes (CPs). In sum, one TTI or subframe may include 14 (or 12) LB symbols, but the present disclosure is not limited to such a frame, a subframe, or a time-slot structure.

Each TTI or subframe is divided into 14 (or 12) symbols (axes) in a time region. Each symbol (axis) may carry one symbol.

Further, 20 MHz of the whole bandwidth of the system may be divided or split into subcarriers in different frequencies, and an example thereof is configured to be divided into 12 succeeding subcarriers corresponding to 180 KHz.

For example, 10 MHz of a bandwidth in a slot may include 50 RBs in a frequency region.

Each grid space of a time-frequency region configured by each subcarrier in each symbol in a time region and each subcarrier in a frequency region may be called a resource element (hereinafter referred to as an "RE"). Each time-frequency region in the structure as described above configured by a pair of one subframe (1 TTI) in a time region and one resource block (RB) corresponding to 12 subcarriers in a frequency axis may have 14×12=168 (or 12×12=144) REs.

Meanwhile, in an LTE communication system, various reference signals (RSs) are defined in downlink, such as a Cell-specific Reference Signal (CRS), a Multicast/Broadcast over Single Frequency Network Reference Signal (MBSFN-RS), and a UE-specific Reference Signal.

Among these, a CRS is a reference signal for a unicast transmission, not for an MBSFN transmission. The CRS is to be included in all downlink frames in cells that do not support a MBSFN transmission and to be transmitted. In addition, the CRS should be transmitted from one or more of antenna ports 0 to 3.

In addition, one reference signal is transmitted to each downlink antenna port, and an RE used for one CRS transmission in an antenna port in a slot may not be used for another antenna port in the same slot.

If CRSs are mapped to REs in different time-frequency regions for 4 antenna ports, each of the REs to which CRSs for each antenna port are allocated has a cycle of 6 with respect to subcarriers, which is defined by the following equation.

$$v_{shift}=N_{ID}^{cell} \bmod 6 \qquad \text{[Equation 1]}$$

Meanwhile, as described above, some next generation communication technologies provide up to 8 antennas for downlink. Therefore, the existing CRSs which are defined for four antennas are not sufficient for determining channel information at the time of downlink transmission. For this, a reference signal of a CSI-RS is newly defined so that channel state information with respect to up to 8 antennas can be determined.

In the CSI-RS currently discussed in LTE-A, one RE is allocated for each antenna port per duty cycle in a time axis in an area of 12 subcarriers corresponding to one resource block in a frequency axis with respect to each cell.

That is, up to 8 REs are allocated and transmitted for 8 antenna ports in total. At this time, the duty cycle corresponds to multiples of 5 ms of time configured by 5 subframes (that is, the duty cycle may be 5 ms, 10 ms, or the like).

If the duty cycle is 5 ms, the CSI-RSs are transmitted to up to 2 subframes out of 10 subframes in a radio frame which correspond to 10 ms. Therefore, if a CSI-RS pattern for one subframe is defined, CSI-RSs can be allocated to the other subframes with a duty cycle.

In the present disclosure, the duty cycle for the CSI-RS transmission is defined as a CSI-RS transmission duty cycle.

Meanwhile, a discussion has been made with respect to a communication system using up to 8×8 multiple input multiple output (MIMO) antennas in both transmission and reception terminals. Since a different CSI-RS is to be transmitted for each antenna port or layer, a transmitter is to allocate CSI-RSs for up to 8 antenna ports differently from time-frequency region to time-frequency region. Especially, CSI-RSs are to be allocated also differently from cell to cell in a multi-cell environment.

At this time, a basic definition of a CSI-RS has been determined and overhead for each antenna port in one subframe are currently defined as described above. However, a method for allocating and transmitting CSI-RSs for each antenna/base station (cell) has not been specifically defined.

FIGS. 2 to 13 are diagrams illustrating representative examples for mapping CSI-RSs to one subframe, which are CSI-RS patterns defined by frame structures (hereinafter referred to as "FS") of subframes, normal or extended cyclic shifts (hereinafter referred to as "CP"), and the number (one of 2, 4, and 8) of antenna ports.

First, FIGS. 2 to 5 are CSI-RS patterns for a normal CP which are basically (mandatorily) applied to all of FS1 (Frame Structure 1, FDD) and FS2 (Frame Structure 2, TDD (excluding special subframes)).

Figure 2:
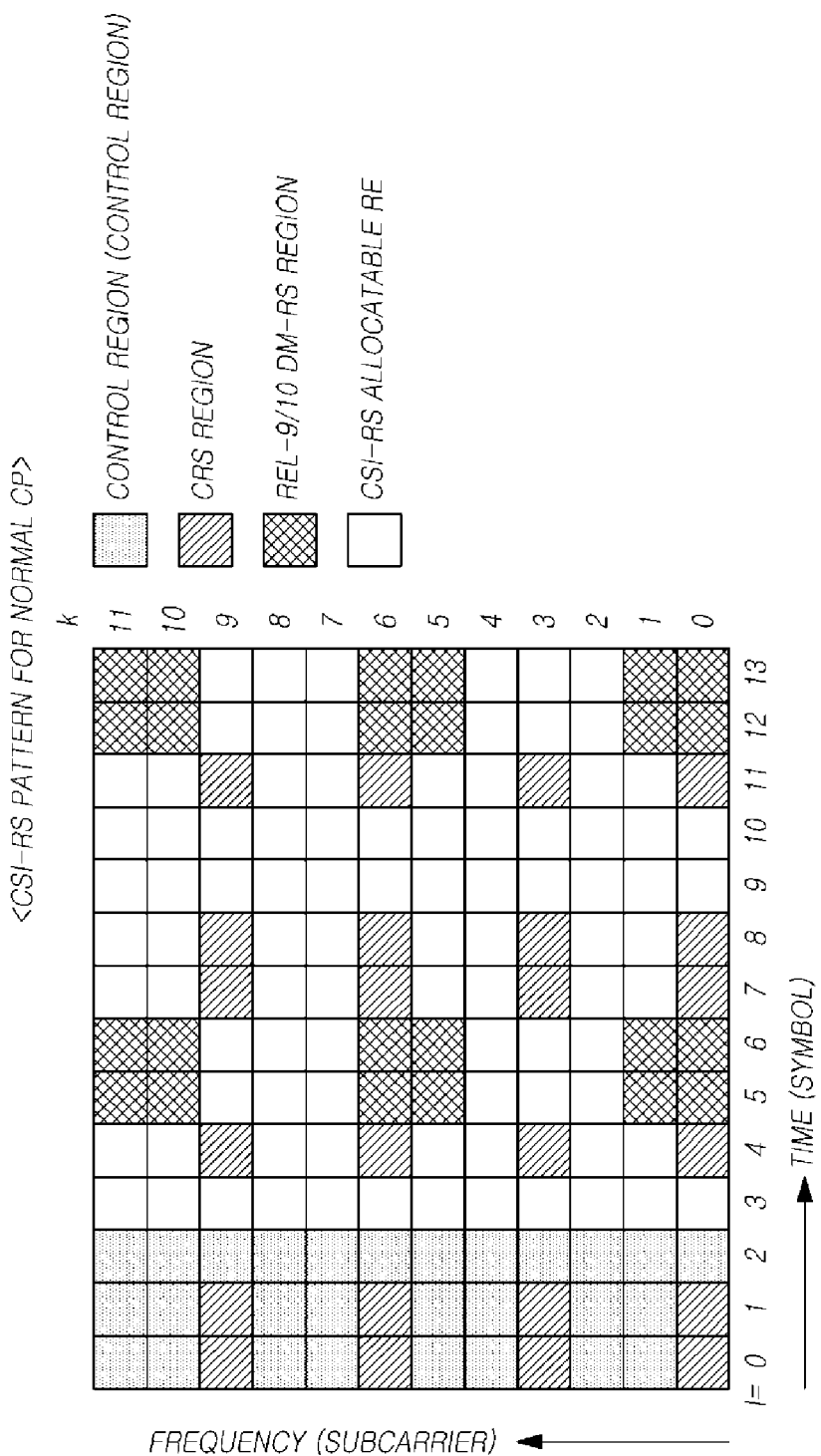

As illustrated in FIG. 2, in the case of a normal subframe, CSI-RSs are allocated to resources in one subframe reflecting already used locations of CRS regions, control regions, and DM-RS (Demodulation Reference Signal) Rel-9/10 regions among 14 symbols in total so that the CSI-RSs are not overlapped with the CRS regions, the control regions, and the DM-RS (Demodulation Reference Signal) Rel-9/10 regions. In FIG. 2, unshaded REs are regions to which CSI-RSs can be allocated.

Figure 3:
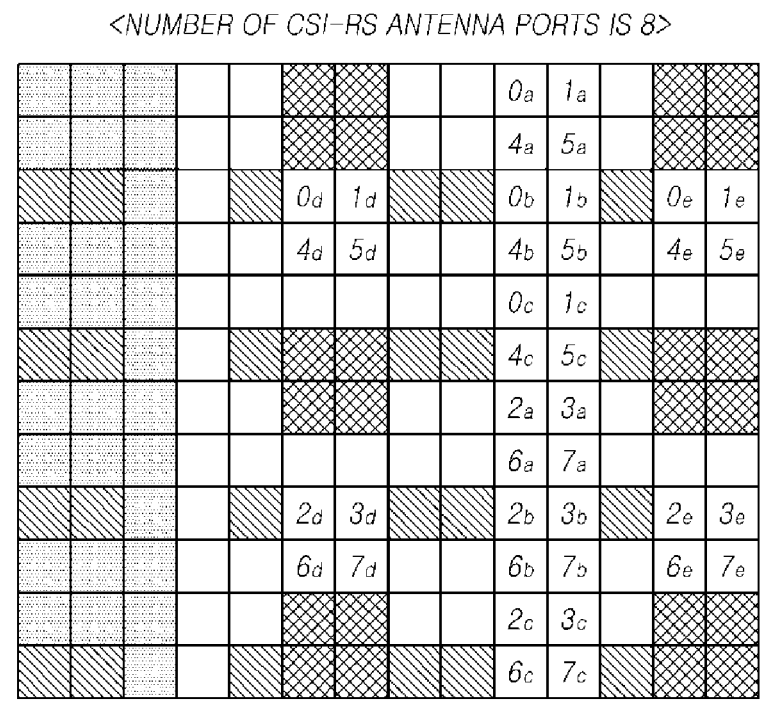
Figure 4:
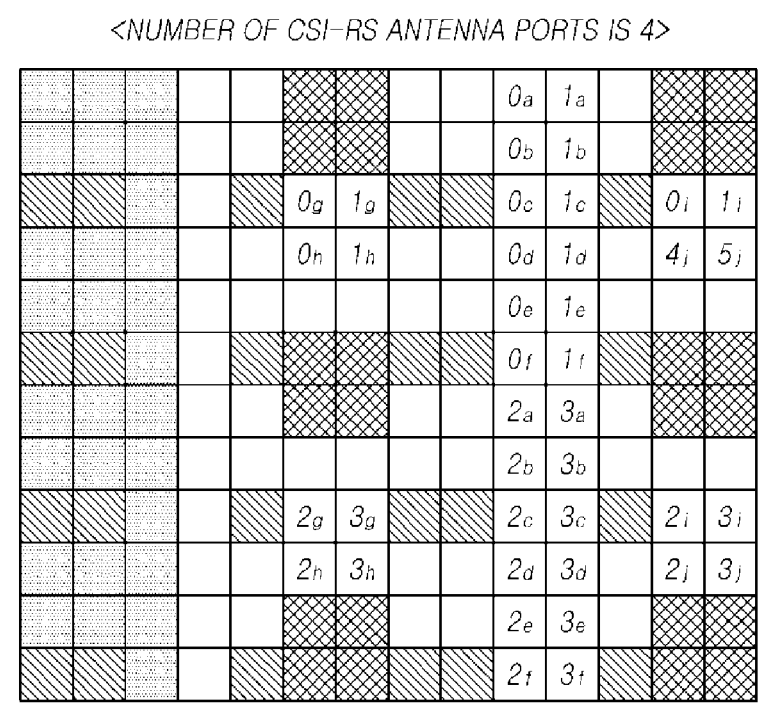
Figure 5:
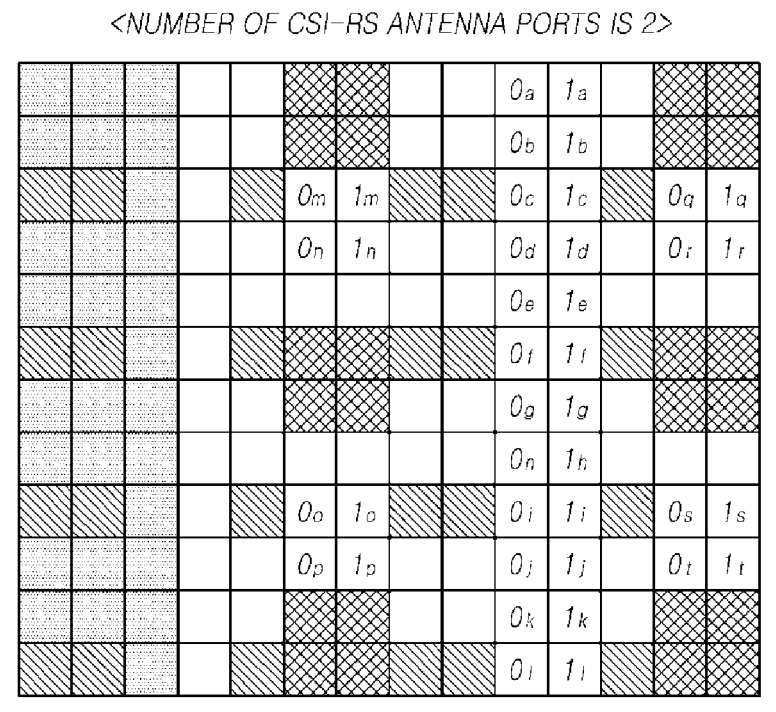

FIGS. 3 to 5 illustrate all possible CSI-RS patterns with respect to the number of antenna ports in a resource region as illustrated in FIG. 2. Each CSI-RS pattern is distinguished with alphabet subscripts.

As illustrated in FIG. 3, in the case of 8 antenna ports (antenna port numbers 0 to 7), the CSI-RS patterns may be 5 in total from "a" to "e" patterns.

In FIG. 3 or the following figures, numerals are antenna port numbers and alphabet subscripts are identifiers indicating CSI-RS patterns or muting patterns.

Meanwhile, when the number of CSI-RS antenna ports is 2 or 4, not 8, CSI-RS patterns are configured by a nested structure where the number of CSI-RS antenna ports is 8.

That is, patterns when the number of CSI-RS antenna ports is 4 are configured by patterns divided from each specific pattern where the number of CSI-RS antenna ports is 8. Accordingly, the total number of the patterns is two times the number of the patterns where the number of the CSI-RS antenna ports is 8. Patterns when the number of CSI-RS antenna ports is 2 are also configured by patterns divided from each specific pattern where the number of CSI-RS antenna ports is 4. Accordingly, the total number of the patterns is two times the number of the patterns where the number of the CSI-RS antenna ports is 4.

For example, as illustrated in FIGS. 3 to 5, CSI-RS patterns basically applied to a case of a normal CP in one subframe is 5 types ("a" to "e" illustrated in FIG. 3) when the number of CSI-RS antenna ports is 8, is 10, which is two times thereof, ("a" to "j" illustrated in FIG. 4) when the number of CSI-RS antenna ports is 4, and becomes 20 ("a" to "t" illustrated in FIG. 5) when the number of CSI-RS antenna ports is 2.

FIGS. 6 to 9 illustrate CSI-RS patterns for extended CPs which are generally applied to all FS1 and FS2 (excluding special subframes).

Figure 6:
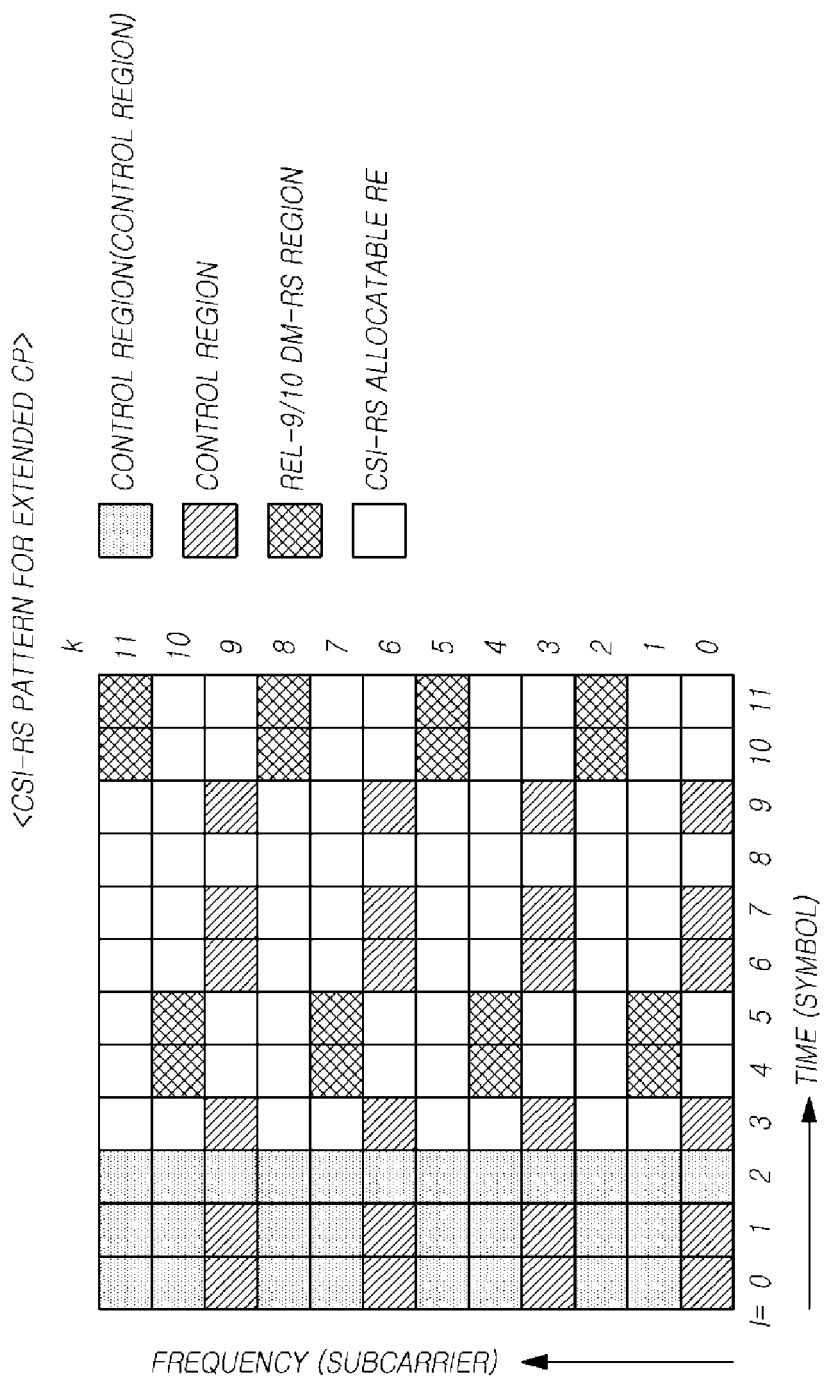
Figure 7:
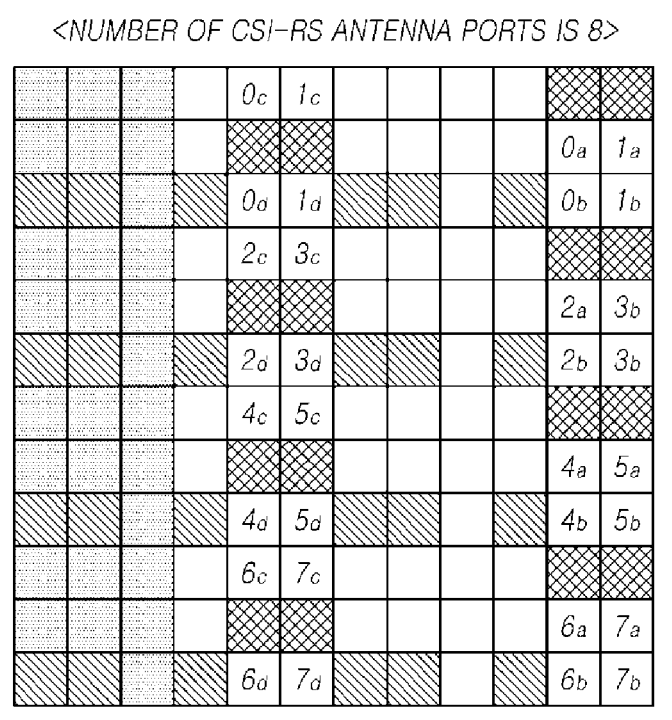

As illustrated in FIG. 6, in the case of an extended CP, CSI-RSs are allocated to resources reflecting already used locations of CRS regions, control regions, and DM-RS Rel-9/10 regions among 12 symbols in total used for downlink so that the CSI-RSs are not overlapped with the CRS regions, the control regions, and the DM-RS (Demodulation Reference Signal) Rel-9/10 regions. In FIG. 7, unshaded REs are regions to which CSI-RSs can be allocated.

Figure 8:
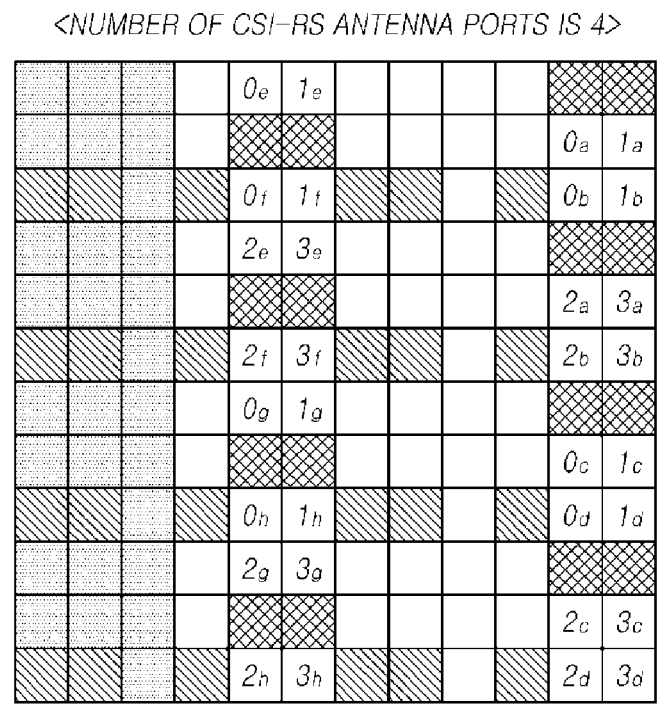

FIGS. 7 to 9 illustrate possible CSI-RS patterns in a resource region as illustrated in FIG. 6 according to the number of antenna ports. Each CSI-RS pattern is differentiated by an alphabet subscript.

As illustrated in FIG. 7, in the case of 8 antenna ports (antenna port numbers 0 to 7), CSI-RS patterns may be 4 in total from "a" to "d" patterns.

In addition, in the case of 2 or 4 antenna ports, principles as illustrated in FIGS. 3 to 5 can be applied.

That is, as illustrated in FIGS. 7 to 9, CSI-RS patterns that are basically applied with respect to an extended CP in one subframe are 4 types when the number of CSI-RS antenna ports is 8 ("a" to "d" in FIG. 7), are 8 types, which are two times thereof, ("a" to "h" illustrated in FIG. 4) when the number of CSI-RS antenna ports is 4, and becomes 16 types ("a" to "p" illustrated in FIG. 5) when the number of CSI-RS antenna ports is 2.

Figure 10:
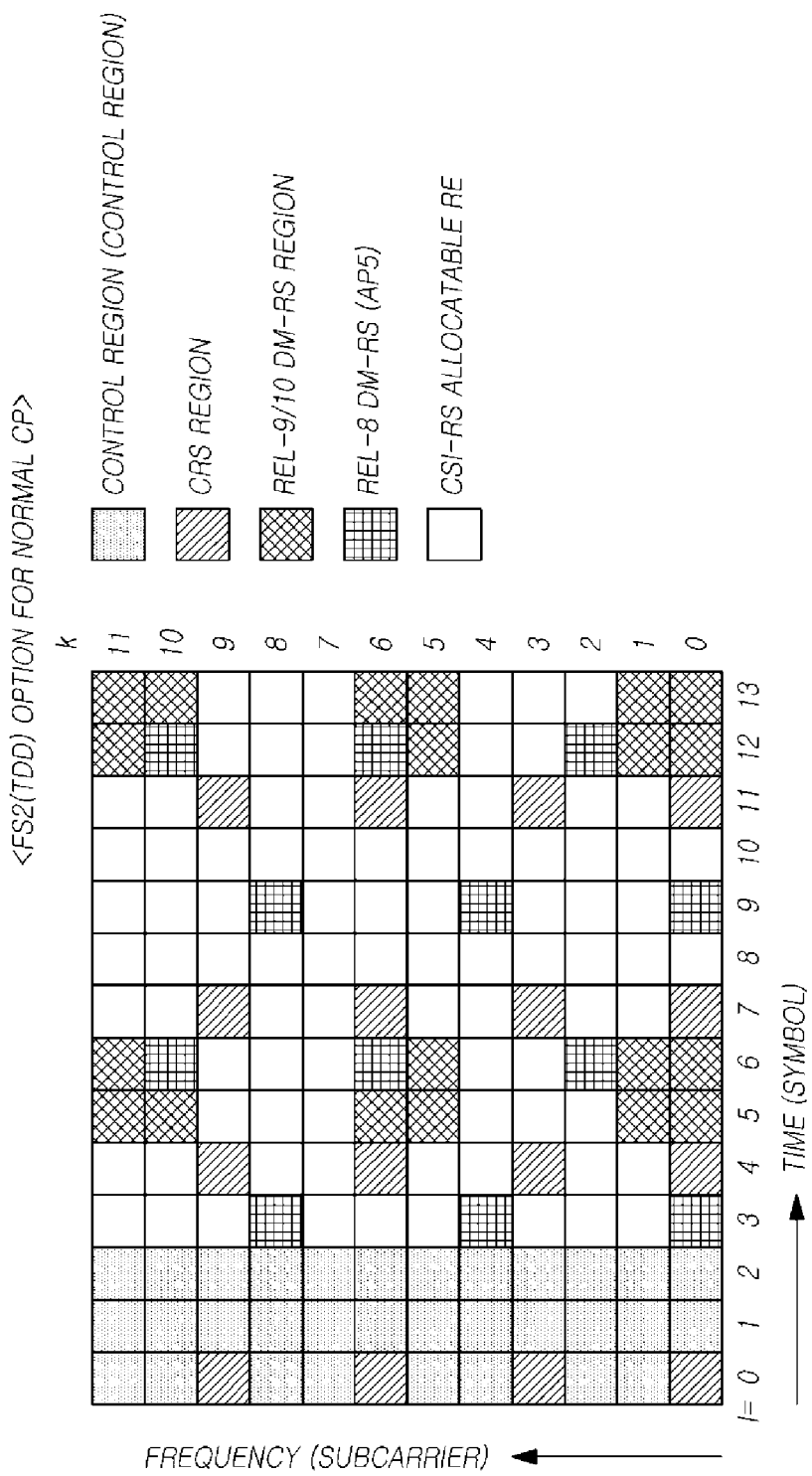
Figure 11:
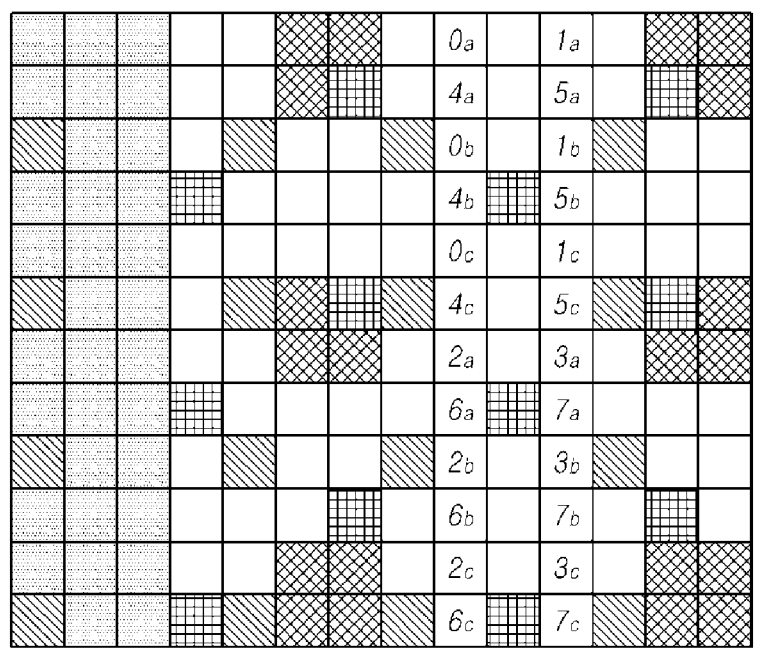
Figure 12:
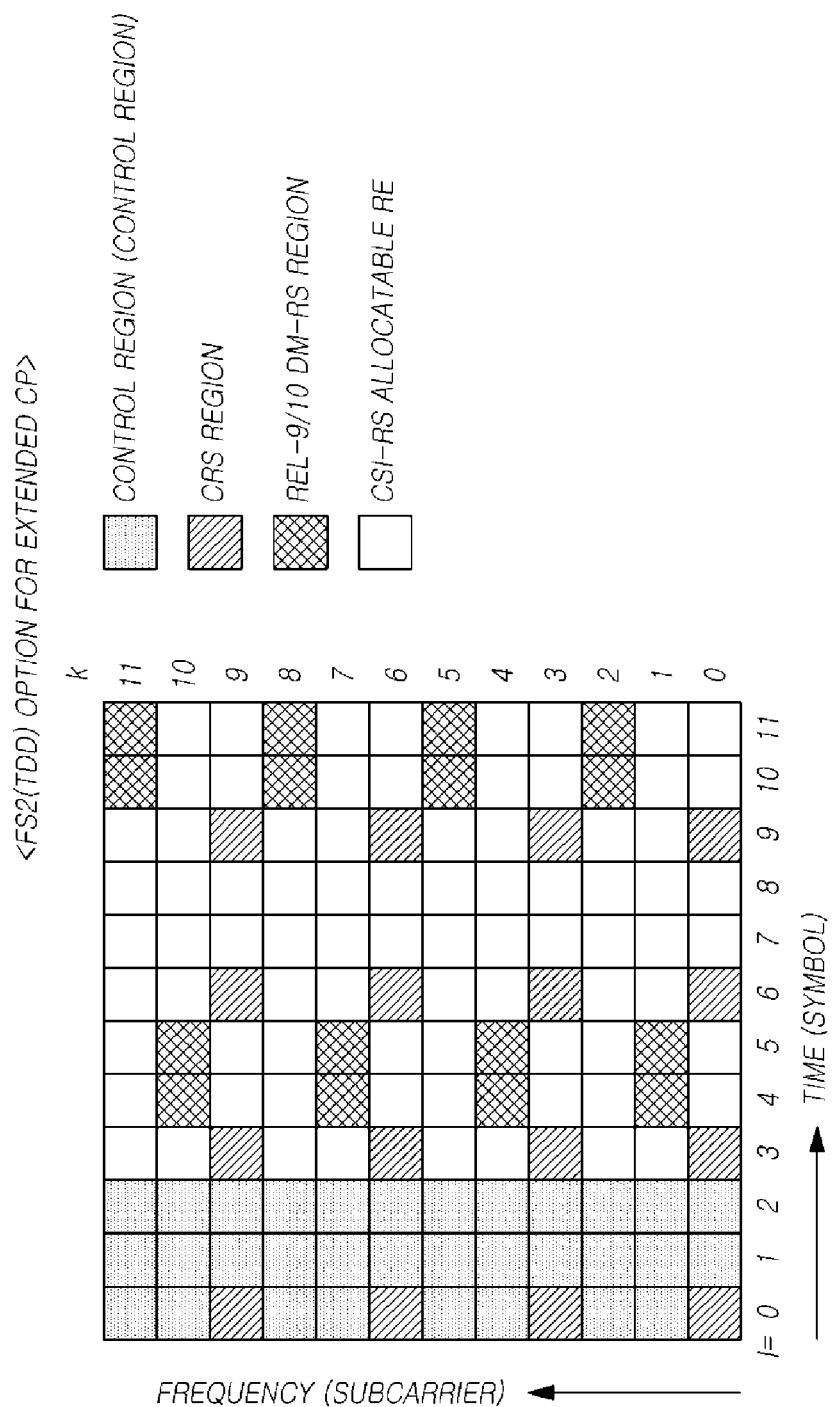

FIGS. 10 to 13 illustrate examples of CSI-RS patterns applied to FS2 as additional options. FIGS. 10 and 11 are cases of normal CPs, and FIGS. 12 and 13 are cases of extended CPs.

FIG. 10 illustrates resource regions to which CSI-RSs can be allocated to FS2 as an additional option. In the case of a normal subframe, CSI-RSs can be allocated to resources reflecting already used locations of CRS regions, control regions, DM-RS Rel-9/10 regions, DM-RS (UE-specific RS) regions of Rel-8 among 14 symbols in total so that the CSI-RSs are not overlapped with the CRS regions, the control regions, and the DM-RS (Demodulation Reference Signal) Rel-9/10 regions. In FIG. 10, unshaded REs are regions to which CSI-RSs can be allocated.

FIG. 11 illustrates possible CSI-RS patterns in the case where the number of antenna ports is 8 in a resource region as illustrated in FIG. 10. The CSI-RS patterns may be 3 types in total from "a" to "c" patterns.

In addition, though it is not illustrated, if a resource region includes 2 or 4 antenna ports, according to the principle as described above, CSI-RS patterns are 6 types, which are two times thereof, when the number of CSI-RS antenna ports is 4, and CSI-RS patterns may be 12 types when the number of CSI-RS antenna ports is 2.

FIG. 12 illustrates resource regions to which CSI-RSs can be allocated to FS2 as an additional option. In the case of a subframe for an extended CP, CSI-RSs can be allocated to resources reflecting already used locations of CRS regions, control regions, and DM-RS Rel-9/10 regions, among 12 symbols in total so that the CSI-RSs are not overlapped with the CRS regions, the control regions, and the DM-RS Rel-9/10 regions. In FIG. 10, unshaded REs are regions to which CSI-RSs can be allocated. In the case of a subframe for an extended CP, CSI-RSs can be allocated to resources reflecting already used locations of CRS regions, control regions, and DM-RS Rel-9/10 regions among 12 symbols in total so that the CSI-RSs are not overlapped with the CRS regions, the control regions, and the DM-RS (Demodulation Reference Signal) Rel-9/10 regions. In FIG. 12, unshaded REs are regions to which CSI-RSs can be allocated.

FIG. 13 illustrates all possible CSI-RS patterns when the number of antenna ports is 8 in a resource region as illustrated in FIG. 12. The CSI-RS patterns may be 7 types in total from "a" to "g" patterns. In addition, though it is not illustrated, if a resource region includes 2 or 4 antenna ports, according to the principle as described above, CSI-RS patterns are 14 types, which are two times thereof, when the number of CSI-RS antenna ports is 4, and CSI-RS patterns may be 28 types, when the number of CSI-RS antenna ports is 2.

For the sake of easier description, in the present disclosure, a set of a plurality of CSI-RS patterns defined by whether a CSI-RS is normal or additional, whether a CP is normal or extended, and the number of antenna ports (one of 2, 4, and 8) is defined as a CSI-RS pattern group or a muting pattern group. A specific CSI-RS pattern which is substantially adopted in the group is defined as a CSI-RS pattern or a muting pattern.

However, the terms are not limited thereto, and other expressions or terms may be used as long as they have the same or equivalent concept.

For example, when a CSI-RS pattern is generally applied to a normal subframe and antenna ports are 8 (antenna port numbers 0 to 7) (like the case of FIG. 3), each of the 5 CSI-RS patterns in total from "a" to "e" patterns may be a CSI-RS pattern group or a muting pattern group. Among them, according to the number of the CSI-RS antenna ports such as 2, 4, or 8, a pattern specified for actual CSI-RS allocation and muting may be defined by a CSI-RS pattern or a muting pattern.

Figure 14:
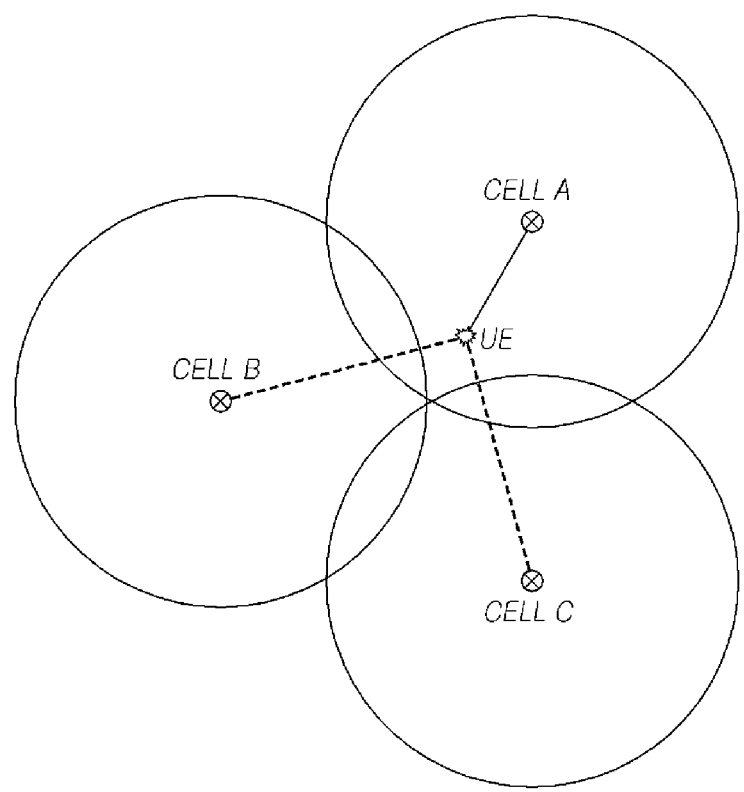
FIG. 14 illustrates a multicell environment to which the present embodiment is applied.

FIG. 14 illustrates a multicell environment such as a cooperative multipoint Tx/Rx system (hereinafter referred to as 'CoMP').

The multicell environment to which the present invention can be applied includes CoMP, but the multicell environment is not limited thereto. It should be understood that the multicell environment includes all the cases where one user equipment should receive CSI-RSs from two or more cells or base stations.

In a CoMP wireless communication system, which is one of the multicell environments, a user equipment (UE) receives information from one or more base stations or cells. In a communication system where a corresponding user is required to transmit and receive reference signals not only to a serving cell which mainly performs transmission and reception but also to a neighboring cell, CSI-RSs of the neighboring cell have weaker reception power than those of the serving cell. Therefore, it is difficult for the user to properly detect CSI-RSs from the neighboring cell if the serving cell and the neighboring cell simultaneously transmit CSI-RSs from the same time/frequency source or the serving cell transmits data and the neighboring cell transmits CSI-RSs.

For example, in FIG. 14, 3 cells of Cell A, Cell B, and Cell C form a CoMP set, and a specific UE in Cell A which is a serving cell receives not only CSI-RSs from Cell A but also CSI-RSs from Cell B and Cell C to measure channel state information. At this point, each cell has one of the patterns defined in FIGS. 2 to 13 as a CSI-RS pattern.

For example, if each cell has 8 CSI-RS antenna ports with a general CSI-RS pattern of a normal CP, each cell transmits CSI-RSs in one of the 5 patterns as illustrated in FIG. 3. That is, for example, Cell A is a first pattern of the 5 patterns, Cell B is a second pattern of the 5 patterns, and, Cell C is a fourth pattern of the 5 patterns. Information on the patterns may be implicitly determined based on Cell ID, or may be explicitly determined by scheduling or signaling of an upper layer to each base station.

Here, in view of Cell A which is a serving cell, Cell A transmits CSI-RSs to an area corresponding to the first pattern which is a CSI-RS pattern with respect to Cell A among five patterns, and transmits DATA to the second, third, fourth, and fifth patterns which are CSI-RS patterns with respect to the other cells. In view of a UE in Cell A, the UE performs decoding with a knowledge that CSI-RSs for Cell A is transmitted to the area corresponding to the first pattern among information received from Cell A which is a base station, and the UE performs decoding with a knowledge that data is transmitted to the areas corresponding to the other second, third, fourth, and fifth patterns.

However, in a multicell environment such as CoMP, it is necessary for the resource region corresponding to the second pattern to receive not only data but also CSI-RSs from Cell B. Even though CSI-RSs are transmitted at a higher transmission power than data, CSI-RS information from Cell B which is farther from the UE may experience more serious intervention from data information from Cell A which is closer from the UE. Therefore, Cell A may perform muting, which implies zero power transmission without transmitting data to a resource region to which Cell B transmits CSI-RS, so that the UE in Cell A receives CSI-RS information from Cell B without intervention.

In addition, in view of the UE in Cell A, the UE knows that not data from Cell A, but information muted with zero power is transmitted to a resource region to which Cell B transmits CSI-RSs, and that CSI-RS are transmitted from Cell B, and the UE decodes the CSI-RS.

That is, if CSI-RS patterns are configured to each cell in consideration of a multicell environment such as CoMP, muting, which implies zero power transmission without transmitting data, may be performed on a part where a CSI-RS is configured according to a CSI-RS pattern in the neighboring cell that configures a CoMP set in order to reduce the influence of the intervention by the neighboring cell.

As illustrated in FIG. 14, in view of Cell A which is a serving cell, information of which Cell A informs the UE in Cell A may be CSI-RS patterns of the corresponding Cell A, the number of CSI-RS antenna ports, a CSI-RS transmission cycle, and a transmission offset.

However, the UE in Cell A which is a serving cell does not know the information relating to CSI-RSs of neighboring cells in a multicell environment. In this circumstance, if muting is performed in order to reduce the influence of intervention by neighboring cells, the UE in Cell A, which is a serving cell, does not know whether Cell A transmits data to a resource region which has CSI-RS patterns in the neighboring cell or performs muting with zero power. Therefore, there may be a problem at the time of performing decoding.

In order to solve this problem, the present embodiment applies a technology of transmitting, to a user equipment, information on whether or not each cell performs muting on a CSI-RS resource region to have possible CSI-RS patterns of the neighboring cells, that is, muting information.

For this, the simplest way is to provide information on whether muting is to be performed to all parts that are to have possible CSI-RS patterns of neighboring cells or data is to be transmitted through one-bit signaling without muting (which may be upper layer signaling through RRC or PDCCH signaling).

That is, for example, if each cell has 8 CSI-RS antenna ports configured in a general CSI-RS pattern of a normal CP, each cell may be configured by one of the five patterns illustrated in FIG. 3. If it is assumed that a serving cell is Cell A, Cell A informs each UE of information on whether muting is performed on all regions to which CSI-RSs for all the other cells are to be transmitted except regions to which CSI-RSs for Cell A is to be transmitted through one-bit signaling, or data is to be transmitted without muting.

However, when muting is performed on all areas, areas to which data is not transmitted may be unnecessarily large in order to reduce intervention from neighboring cells in a multicell environment. Therefore, resources may be wasted. When data is transmitted without performing muting on all areas, there may be a problem of intervention by neighboring cells. Therefore, it is effective not to perform muting on all possible CSI-RS patterns but to perform muting on partial necessary areas. A base station needs to signal information about where the partial areas are to a UE.

That is, the corresponding base station signals the portion, in which muting, which implies zero power transmission without transmitting data, is to be performed, among the parts for configuration of a CRS-RS in each neighboring cell, to each UE. At this time, a muting region which is signaled may be all or partial portions where all possible CSI-RSs of neighboring cells are configured, and the CSI-RS pattern of the neighboring cells configuring a CoMP set is configured in consideration of CSI-RS patterns, the number of CSI-RS antenna ports of respective neighboring cells, a muting duty cycle (period or cycle) on time/frequency or an offset.

In specific, a method for transmitting muting information according to the present embodiment includes steps of receiving neighboring cell information including one or more of CSI-RS patterns, the number of CSI-RS antenna ports, a CSI-RS transmission cycle, CSI-RS transmission subframe offset information; a step of determining a muting region which is a time/frequency region that is overlapped with CSI-RSs of the corresponding neighboring cell and requires muting, based on neighboring cell information; a step of generating muting information including a first data field that indicates the muting region and indicates a muting duty cycle and a muting offset of a muting subframe, and a second data field that indicates one or more of a muting pattern group and a specific muting pattern in the muting subframe; and a step of transmitting the generated muting information to a user equipment.

The step of generating muting information may further include a first step of generating a first data field determining a muting duty cycle and a muting offset and indicating the determined muting cycle and muting offset; and a second step of generating a second data field that indicates one or more of a muting pattern group and a specific muting pattern in one muting subframe.

The performance method of the first step may be determined based on a location of the muting subframe in which the muting is required and a relation between CSI-RS transmission cycles and CSI-RS transmission offset of the specific cell or the neighboring cell. This will be described below in detail.

Therefore, the muting information according to the present embodiment may have separate values per neighboring cells or a unified single value, and includes a first data field indicating a muting duty cycle and a muting offset, and a second data field indicating one or more of a muting pattern group and a specific muting pattern in one muting subframe.

Figure 15:
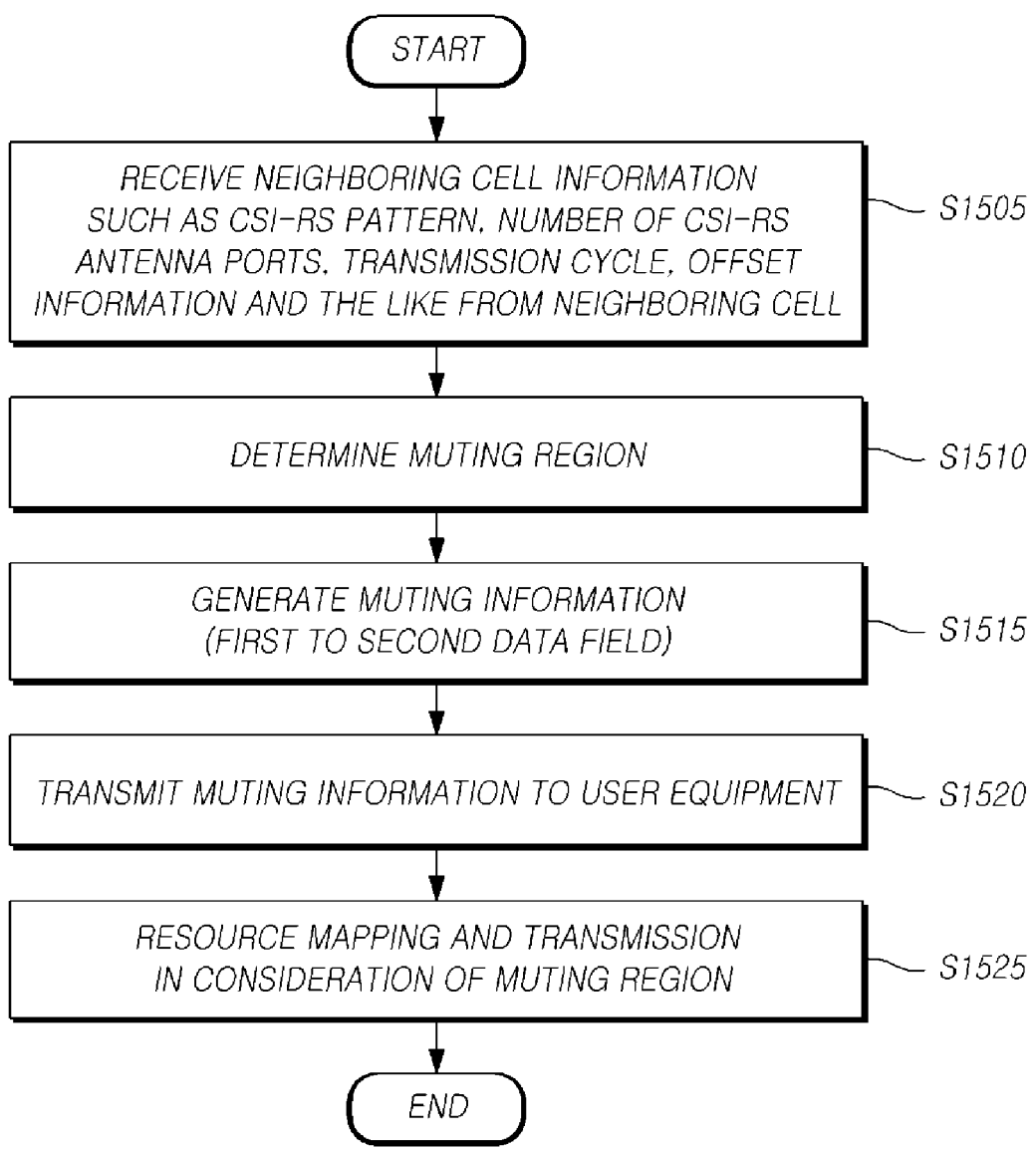
FIG. 15 illustrates a flow of a method of transmitting CSI-RS muting information according to the present embodiment.

FIG. 15 illustrates a flow of a method of transmitting CSI-RS muting information according to the present embodiment.

The method of transmitting CSI-RS muting information according to the present embodiment is performed in a serving cell or a serving base station that currently provides service to the user equipment in a multicell environment, but the method is not limited thereto.

The method of transmitting CSI-RS muting information according to the present embodiment may include a step of receiving, from a neighboring cell, information including one or more of CSI-RS patterns, the number of CSI-RS antenna ports, a CSI-RS transmission cycle, and CSI-RS transmission subframe offset information (S1505); a step of determining a muting region which is a time/frequency region that is overlapped with CSI-RSs of the corresponding neighboring cell and requires muting, based on neighboring cell information (S1510); a step of generating muting information including a first data field that indicates the muting region and indicates a muting duty cycle and a muting offset of a muting subframe, and a second data field that indicates one or more of a muting pattern group and a specific muting pattern in one muting subframe (S1515); and a step of transmitting the generated muting information to a user equipment (S1520).

In addition, the method of transmitting CSI-RS information according to the present embodiment may further include a step of performing resource element mapping including a muting process for performing zero power transmission without transmitting data to the muting region in consideration of the determined muting region at the time of resource element mapping to a resource region (PDSCH, Physical Downlink Resource Channel) for data transmission and transmits this to the user equipment (S1525). The step S1525 may be configured after the step S1520 of transmitting the muting information to the user equipment, or may be configured after the step S1510 of determining the muting region, or the step S1515 of generating the muting information.

In step S1505, the corresponding base station receives neighboring cell information including information on one or more of CSI-RS patterns, the number of CSI-RS antenna ports, CSI-RS transmission subframe offset, and a CSI-RS transmission cycle in one subframe configured in each neighboring base station from a neighboring base station as an object of muting. At this time, the neighboring base station (cell) as an object of muting may be all neighboring base stations (cells) having different CSI-RS patterns, may be some neighboring base stations (Cell B and Cell C in FIG. 14) that form a CoMP set except a serving cell (Cell A in FIG. 14) as illustrated in FIG. 14, or may be one or more neighboring base stations (cells) as objects of muting.

Step S1505 is information transmission between base stations (cells), and an example thereof may be information transmission through X2 interface, but the step is not limited thereto.

The muting region means a region where zero power transmission without transmitting data is performed since there may be intervention on a region to which CSI-RSs of a neighboring cell are allocated when a serving cell allocates a resource region (PDSCH) for data transmission, and the muting information means information used for designating the region.

Figure 16:
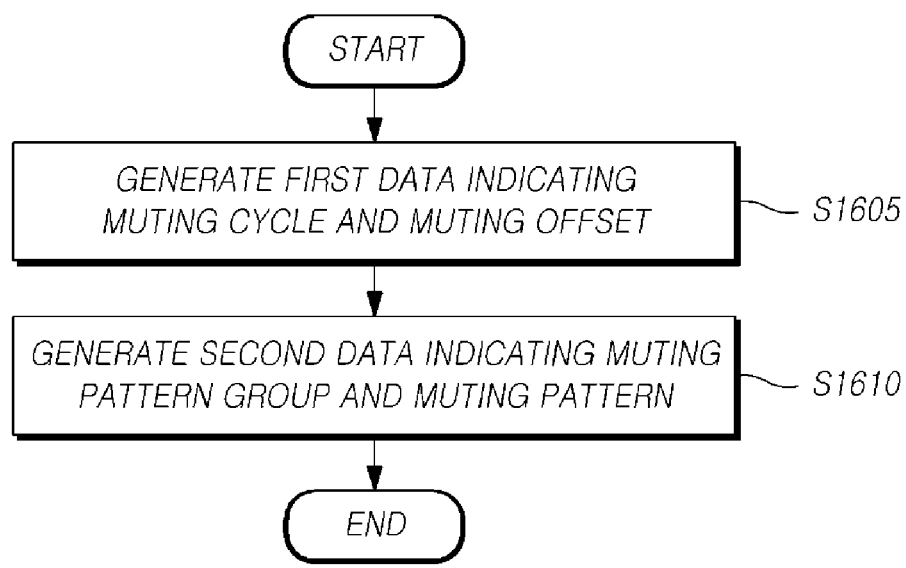
FIG. 16 is a flowchart illustrating a detailed configuration for steps of generating muting information in the present embodiment.

FIG. 16 is a flowchart illustrating a detailed configuration for steps of generating muting information in an embodiment of the present invention.

The step of generating muting information in FIG. 15 (S1515) includes a first step S1605 of generating a first data field for determining a muting duty cycle and a muting offset and indicating the muting duty cycle and the muting offset and a second step S1610 of generating a second data field indicating one or more of a muting pattern group and a specific muting pattern in one muting subframe.

A base station corresponding to a serving cell configures muting information indicating a muting region where transmission with zero power without transmitting data is performed with 2 steps in total. The first step of the two may be performed at the very first time, but the first step may also be performed at the end after the second step is performed. The information configured through the first and second steps is signaled to the user equipment (UE), and the corresponding cell performs muting, which implies zero power transmission without transmitting data, according to a muting pattern from the corresponding neighboring cell in a subframe corresponding to a muting offset per corresponding muting duty cycle based on the muting information.

At this time, information relating to muting which is transmitted or signaled to the user equipment may be transmitted through an upper layer signaling such as RRC, or may be dynamically transmitted through PDCCH.

The user equipment in a serving cell performs decoding in consideration of a muting region (that is, a muted part where zero power transmission without transmitting data is performed) which is known by signaled muting information. If the UE does not know whether data is transmitted to the corresponding PDSCH region, or muting, which implies zero power transmission without transmitting data, is performed (and if the UE does not know whether or not data is not transmitted to the time/frequency resource region and CSI-RSs from a neighboring cell are transmitted), there may be an error or decrease in quality at the time of decoding. However, when decoding is performed in consideration of the muting information described above, these problems are not generated.

Herein below, specific configurations of the first and second steps for configuring the muting information, that is, processes for configuring the muting information, types of configured information, and the number of bits are described in detail.

First Step

Hereinafter, each case of the first step of generating a first data field for determining a muting duty cycle and a muting offset and indicating the muting duty cycle and the muting offset is described.

The first step is for specifying a subframe as an object of muting in consideration of information relating to CSI-RSs of each corresponding neighboring cell as an object of muting. The information is configured through a muting duty cycle and a muting offset, and a base station performs muting in a subframe expressed by the corresponding muting offset per muting duty cycle.

The information may be transmitted as one unit of information which is the same for each corresponding neighboring cell as an object of muting (in this case, the muting information is the same for the neighboring cells as an object of all muting, so one unit of information is transmitted), or a plurality of units of information per corresponding neighboring cell as an object of all muting may be transmitted (in this case, the muting information may be different from neighboring cell to neighboring cell as an object of muting, so the number of transmissions of information corresponds to the number of the neighboring cells as an object of muting).

This first step can be divided into 5 cases according to a relation of a muting duty cycle and a muting offset with a CSI-RS transmission cycle and a CSI-RS transmission offset of a serving cell. The 5 cases will be described in 1) to 5) below.

That is, the first step may be realized by differentiation in various ways according to a relation of a subframe which requires muting (that is, a muting subframe) among CSI-RSs of a serving cell with a CSI-RS transmission cycle and a CSI-RS transmission offset of the serving cell or the neighboring cell in consideration of intervention with the neighboring cells.

Bit

1) A Case where a Muting Duty Cycle and a Muting Offset are the Same as a CSI-RS Transmission Cycle and a CSI-RS Transmission Offset of the Serving Cell (Base Station)

(This is a Case where the Muting duty cycle or the muting offset is the same for all the neighboring cells as muting objects, and the information configured below is transmitted as one unit of information which is the same for all the neighboring cells as muting objects.)

In this case, the number of bits that configure a first data field may be 0 bits.

In this case, a serving cell determines that a subframe transmitting CSI-RSs is a subframe as an object of muting.

For example, when a CSI-RS transmission cycle of a serving cell is 10 ms, and a transmission offset is 3, CSI-RS are transmitted to a fourth subframe (subframe number 3). The fourth subframe becomes a subframe as a muting object, so special information is not required for designating a subframe to which CSI-RS of the neighboring cell are transmitted.

2) A Case where a Muting Offset is the Same as a CSI-RS Transmission Offset of a Serving Cell, and a Muting Duty Cycle is a Multiple of a CSI-RS Transmission Cycle of the Serving Cell (This is a case where a muting duty cycle or a muting offset is the same for all neighboring cells as muting objects, and basically the information configured below is transmitted as one unit of information which is the same for all the neighboring cells as muting objects. However, for performing muting in a more correct manner, a muting offset is the same for all the neighboring cells as muting objects, but the muting duty cycle may be different from neighboring cell to neighboring cell. The information configured below is configured and transmitted in a separate manner for each corresponding neighboring cell as muting objects.)

In this case, the method can be divided into two detailed configurations, and this is described by dividing the method into Methods 2-1, 2-2, and 2-3.

2-1) Method 2-1

Muting is not performed on all CSI-RS configuration subframes of the neighboring cell, but some CSI-RS configuration subframes of the neighboring cell are muted in order to reduce regions to which data cannot be transmitted by being muted.

At this time, the number of the information bits configuring a first data field may be 2 bits, 4 bits, 8 bits, . . . , and $2^M$ bits (M is a natural number). Further, $\lceil \log_2 M \rceil$ bits may be additionally required, but $\lceil \log_2 M \rceil$ bits may not be transmitted. Here, M is a natural number, and M may be determined so that $2^M$ is equal to or larger than the maximum multiple value of the muting duty cycle for a CSI-RS transmission rate.

For example, if the maximum multiple value is 16, M=4. In this case, a first data field may be configured to be any one value of 2, 4, 8, and 16 bits and additional $\lceil \log_2 M \rceil$ bits may be required for indicating the number of the configuration bits.

Here, if M=4, a bitmap is formed with 0 or 1 for each bit among information bits configured with 2 bits, 4 bits, 8 bits, or 16 bits, and each bit corresponds to one CSI-RS transmission cycle of a serving cell.

That is, with respect to a subframe corresponding to a CSI-RS transmission offset in each CSI-RS transmission cycle, if the a bit value thereof is 0, muting may be performed, and if the bit value thereof is 1, data may be transmitted (of course, it may be configured to transmit data when the bit value is 0, and to perform muting when the bit value is 1).

In addition, depending on how many bits the number of the information bits configuring a first data field is, signaling may be performed with $\lceil \log_2 M \rceil$ bits. If M=4, the number of bits additionally included for signaling is 2 bits. When the bit values are "00", "01", "10", and "11", the configured information bit values are 2 bits, 4 bits, 8 bits, and 16 bits, respectively.

In this case, depending on each bit value of the information bits configuring a first data field, only when the bit value is 0, it is determined that a subframe corresponding to a CSI-RS transmission offset in a CSI-RS transmission cycle of a serving cell is a subframe as an object of muting.

For example, when a CSI-RS transmission cycle of a serving cell is 10 ms and an offset is 3, CSI-RSs are transmitted to the fourth subframe (subframe number 3). At this time, when the configured number of information bits is 4 bits and the bit value is "0101", muting is performed in first and third transmission cycles among four transmission cycles forming 40 ms in total, and a fourth subframe in each transmission cycle becomes a subframe as an object of muting.

2-2) Method 2-2

In this case also, muting is not performed on all CSI-RS configuration subframes of the neighboring cell, but some CSI-RS configuration subframes of the neighboring cell are muted in order to reduce regions to which data cannot be transmitted by being muted. At this point, the number of bits configuring a first data field may be $\lceil \log_2 2 \cdot (2^M - 1) \rceil$ bits.

A specific cycle, which is a multiple of a CSI-RS transmission cycle of a serving cell, and an offset in the specific cycle are newly defined, and muting is performed only for a CSI-RS transmission cycle of a serving cell corresponding to an offset in the cycle.

For example, when M=4, the specific cycle is determined by a value corresponding to 2 times, 4 times, 8 times, and 16 times of a CSI-RS transmission rate of a serving cell. Thirty types of specific cycles in total, 2 types, 4 types, 8 types, and 16 types when the a CSI-RS transmission rate is 2 times, 4 times, 8 times, and 16 times, are configured, and the total number of bits is 5 bits.

For example, if the bit value of 5 bits is 0 to 1, 2 types of offsets when the specific cycle is 2 times of a CSI-RS transmission cycle of a serving cell are expressed. If the bit value is 2 to 5, 4 types of offsets when the specific cycle is 4 times of the CSI-RS transmission cycle of the serving cell are expressed. If the bit value is 6 to 13, 8 types of offsets when the specific cycle is 8 times of the CSI-RS transmission cycle of the serving cell are expressed. If the bit value is 14 to 29, 16 types of offsets when the specific cycle is 16 times of the CSI-RS transmission cycle of the serving cell are expressed.

Muting is performed only on a CSI-RS transmission cycle corresponding to an offset in a specific cycle, and muting is not performed on the others. That is, it is determined that a subframe corresponding to a CSI-RS transmission offset in a CSI-RS transmission period of the serving cell expressed by the specific cycle and the offset is a subframe as an object of muting.

For example, if a CSI-RS transmission cycle of a serving cell is 10 ms, and an offset is 3, CSI-RSs are transmitted to the fourth subframe (subframe number 3). At this point, if the configured number of information bits is 5 bits, and the bit value is "01010" (a bit value is 10, and this corresponds to a case where a specific cycle is 8 times and an offset is 5), muting is performed only in a fifth transmission cycle among 8 transmission cycles in which a CSI-RS transmission cycle of a serving cell is 80 ms, which is 8 times of 10 ms. A fourth subframe in the transmission cycle is a subframe as an object of muting.

2-3) Method 2-3

A muting offset is not transmitted since the muting offset is the same as a CSI-RS transmission offset of a serving cell, and a muting duty cycle is a multiple of the CSI-RS transmission cycle of the serving cell, so only the muting duty cycle is transmitted in a separate manner. For example, in the cases where the muting duty cycles are 1 time, 2 times, 4 times, 8 times, and 16 times of a CSI-RS transmission cycle, these 5 cases are configured and transmitted with 3 bits. (In the above case, the exemplary types of the multiple values are five, but the configuration and the number of the multiple values may vary. For example, 4 cases of 1 time, 2 times, 4 times, and 8 times are configured with 2 bits, or 8 types of multiple values larger than the above 5 types of values are configured by each types, and transmitted with 3 bits.) For example, if the CSI-RS transmission cycle of the serving cell is 10 ms and the offset is 3, CSI-RS are transmitted to a fourth subframe (subframe number 3). At this point, if the configured number of information bits is 3 bits and the bit value is "010" (if it is configured that the bit value is 2 and 000 is one time, 001 is two times, 010 is 4 times, or the like, this means that 4 times of a cycle of the serving cell is a muting duty cycle), 40 ms which is a four times of 10 ms, which is a CSI-RS transmission cycle of a serving cell, is a muting duty cycle, and a muting subframe offset is 3 which is the same as the subframe offset of the serving cell.

3) A Case where a Muting Offset is the Same as a CSI-RS Transmission Offset of a Serving Cell (Base Station), but a Muting Duty Cycle May be Different from a CSI-RS Transmission Cycle of the Serving Cell (Base Station)

(This is a case where a muting offset is the same for all neighboring cells as an object of muting, but the muting cycles may be different. Basically, the information configured as below is transmitted to each corresponding neighboring cell as an object of all muting in a separate manner. However, in order to reduce the total number of bits for muting signaling, the muting duty cycle and a muting offset may be the same for all neighboring cells as muting objects, and the information configured as below may be transmitted as one item of information which is the same for all neighboring cells as muting objects.)

In this case, the method may be divided into two detailed configurations, and this is described by dividing the method into Methods 3-1 and 3-2.

3-1) Method 3-1

In this case, the number of information bits configuring a first data field may be '2 bits or 3 bits to be determined according to the number N of neighboring cells as an object of each muting×the number of kinds of muting duty cycle (the number of information bits may be 2 bits when the kinds of duty cycles are equal to or less than 4, or may be 3 bits when the kinds of duty cycles are more than 4 and equal to or less than 8)', and the muting duty cycle is determined according to the configured information bit value.

Based on a value of a CSI-RS of a serving cell (base station) modulo a muting duty cycle, a muting offset is determined, so that a subframe as an object of muting is determined from a subframe corresponding to a muting offset in a muting duty cycle per corresponding neighboring cell as an object of each muting.

In addition, the configured information bits may be configured in a separate manner with respect to each corresponding neighboring cell as an object of muting.

For example, when the number of information bits configured in a specific cell as an object of muting is 2 bits, if the bit value is "00", the muting duty cycle is configured to be 5 ms, if the bit value is "01", the muting duty cycle is configured to be 10 ms, if the bit value is "10", the muting duty cycle is configured to be 20 ms, and if the bit value is "11", the muting duty cycle is configured to be 40 ms. If a cycle which is 80 ms or more is configured, the number of bits may be 3 bits. At this point, the configured bit value is "10", and the muting duty cycle is 20 ms. In addition, if the CSI-RS transmission offset of the serving cell is 3, a fourth subframe (subframe number 3) for every 20 ms is a subframe as an object of muting.

3-2) Method 3-2

In this case, the number of information bits configuring a first data field is 'the number N of neighboring cells becoming targets of each muting×2 bits (or 4 bits, 8 bits, . . . , and $2^M$ bits)', and selectively 'N×$\lceil \log_2 M \rceil$ bits' may be additionally included. However, 'N×$\lceil \log_2 M \rceil$ bits' may not be transmitted.

For example, if M=4, a bitmap is formed with 0 or 1 for each bit among information bits configured with 2 bits, 4 bits, 8 bits, or 16 bits. Accordingly, each bit corresponds to 5 ms (or 10 ms) which is a minimum value in a duty cycle. That is, with respect to a subframe corresponding to a value of a CSI-RS transmission offset of a serving cell (base station) modulo 5 (or 10) per a cycle of 5 ms (or 10 ms), if the bit value is 0, muting is performed, and if the bit value is 1, data is transmitted (of course, adversely, it may be configured to perform data transmission when the bit value is 0, and to perform muting when the bit value is 1).

In addition, with respect to how many bits the number of configured information bits is, separate signaling may be performed with $\lceil \log_2 M \rceil$ bits. If M=4, the number of bits that can perform separate signaling is 2 bits. If the bit value is "00", the configured number of information bits is 2 bits, and if the bit values are "01", "10", and "11", the numbers of information bits are 4 bits, 8 bits, and 16 bits, respectively. In this case, the information bit configuring a first data field may be configured in a separate manner with respect to each corresponding neighboring cell as an object of muting.

With respect to each configured bit value of an information bit, only when the bit value is 0, it is determined that a subframe corresponding to a value of a CSI-RS transmission offset of a serving cell (base station) per muting duty cycle corresponding to 5 ms (or 10 ms) modulo 5 (or 10) is a subframe as an object of muting.

For example, if the number of information bits configuring a specific cell as an object of muting is 4 bits and the bit value is "0101", muting is performed only in first and third duty cycles among 4 muting cycles forming 5 ms×4=20 ms in total. When a CSI-RS transmission offset of a serving cell (base station) is 8 (a CSI-RS transmission cycle is 10 ms), a fourth subframe (subframe number 3) corresponding to 3 corresponding to a value of this value modulo 5 is a subframe as an object of muting.

4) A Case where a Muting Duty Cycle is the Same as a CSI-RS Transmission Cycle of a Serving Cell (Base Station), but a Muting Offset May be Different from a CSI-RS Transmission Offset of the Serving Cell (Base Station)

(This is a case where a muting duty cycle is the same for all neighboring cells as objects of muting, but a muting offset may be different, and the information configured as below may be transmitted in a separate manner with respect to each corresponding neighboring cell as an object of all muting)

This is a case where the number of information bits configuring a first data field is "the number N of neighboring cells as objects of each muting×2 to 4 bits".

It is determined that a cycle for transmitting CSI-RSs of a serving cell (base station) is a muting duty cycle, and a muting offset is determined by a bit value transmitted in each muting duty cycle. For example, if a muting duty cycle is 5 ms, the other 4 subframes except a subframe to which PSS/SSS is transmitted are expressed with 2 bit information, and muting offset is determined from this value. When a muting duty cycle is 10 ms, the other 8 subframes except a subframe to which PSS/SSS is transmitted are expressed with 3 bit information. When a muting duty cycle is 20 ms, the other 16 subframes except a subframe to which PSS/SSS is transmitted are expressed with 4 bit information. A subframe as an object of muting is determined from subframes corresponding to a muting offset in a muting duty cycle per corresponding neighboring cell as an object of each muting.

The configured information bit may be configured in a separate manner with respect to each corresponding neighboring cell as an object of muting.

For example, it is determined a fifth subframe, of which the number of information bits configuring a specific cell as an object of muting is 3 bits, and the value is "010" and which is the fourth subframe except PSS/SSS, is a muting offset. When a cycle for transmitting CSI-RSs of a serving cell (base station) is 10 ms, a fifth subframe (subframe number 4) for every 10 ms is a subframe as an object of muting.

5) A Case where a Muting Duty Cycle and a Muting Offset May be Different from a CSI-RS Transmission Cycle and a CSI-RS Transmission Offset of a Serving Cell (Base Station)

(This is a case where a muting duty cycle and a muting offset may be different with respect to each corresponding neighboring cell as an object of all muting, and the information configured as below is transmitted in a separate manner with respect to each corresponding neighboring cell as an object for all muting.)

This case is a configuration in which the number of information bits configuring a first data field is "the number N of neighboring cells as an object each muting×$\lceil \log_2 4 \cdot (2^M - 1) \rceil$".

In this configuration, according to the configured information bit value, a muting duty cycle and a muting offset are determined. For example, if M=3, with respect to 3 types of cycles such as 5 ms, 10 ms, and 20 ms, 4 types, 8 types, 16 types of subframe offsets except PSS/SSS are configured into 28 types of cases in total, and the total bit number is 5 bits.

For example, if the bit value with 5 bits is 0 to 3, 4 types of subframe offsets when the cycle is 5 ms are expressed. If the bit value is 4 to 11, 8 types of subframe offsets when the cycle is 10 ms are expressed. If the bit value is 12 to 27, 16 types of subframe offsets when the cycle is 20 ms are expressed. If M=4, with respect to four types of cycles such as 5 ms, 10 ms, 20 ms, and 40 ms, 4 types, 8 types, 16 types, and 32 types of subframe offsets except PSS/SSS are configured into 60 types of cases in total, and the total bit number is 6 bits.

For example, if the bit value with 6 bits is 0 to 3, 4 types of subframe offsets when the cycle is 5 ms are expressed. If the bit value is 4 to 11, 8 types of subframe offsets when the cycle is 10 ms are expressed. If the bit value is 12 to 27, 16 types of subframe offsets when the cycle is 20 ms are expressed. If the bit value is 28 to 59, 32 types of subframe offsets when the cycle is 40 ms are expressed. A subframe as an object of muting is determined from a subframe corresponding to a muting offset in a muting duty cycle per corresponding neighboring cell as an object of each muting.

In addition, the configured information bit may be configured in a separate manner with respect to each corresponding neighboring cell as an object of muting.

For example, if the number of information bits configuring a specific cell is 5 bits, and the bit value is "01101" (the bit value is 13), the muting duty cycle is 20 ms, and the muting offset is 1. (when the bit value is 12 to 27, 16 types of the subframe offsets when the cycle is 20 ms are expressed, that is, when the bit value is 12, an offset is 0, and when the bit value is 13, an offset is 1) Therefore, with respect to a corresponding neighboring cell, a second subframe (subframe number 2, and subframe number 0 indicates a subframe to which PSS/SSS is mapped) except PSS/SSS for every 20 ms is a subframe as an object of muting.

The explanations above are provided to describe examples of types for configuring a first data field among muting information of FIG. 15. A method for configuring a muting duty cycle or a muting offset indicated by the first data field is not limited thereto.

In addition, each method described above is not applied by separately determining on a case by case method, but one is selected and applied according to a system configuration for CSI-RSs and a standardized method. Each case may include another case (for example, the fifth method among the above methods may be regarded as a generalized case including the other methods).

In the method above, an offset may be defined with respect to all subframes in one radio frame without excluding a subframe to which PSS/SSS is included, and in this case, the configured number of bits may be increased a little bit. For example, in the above example, if M=5, except a subframe to which PSS/SSS is included, 124 types of cases in total is configured with 7 bits. However, in the same manner, for 5 types of cycles such as 5 ms, 10 ms, 20 ms, 40 ms, and 80 ms, with respect to all subframes in the cycles, 5 types, 10 types, 20 types, 40 types, and 80 types of subframes may be configured into 155 types of cases in total, and the total bit number is 8 bits.

Second Step According to Embodiment Illustrated in FIG. 16

Herein below, a description is made of each case in a second step of generating a second data field that determines a muting pattern group in one subframe or a direct specific muting pattern and indicates the muting pattern group or the specific muting pattern.

The second step may be divided into two types: Type 2-1 of configuring a second data field so that information of a specific muting pattern is directly indicated without information of a muting pattern group and Type 2-2 of configuring a second data field so that only a muting pattern group is indicated. Type 2-1 that indicates a specific muting pattern may only be subdivided into one of Types A, B, and C.

However, the second step is not limited to this division method, but may include all methods of configuring a second data field so that a muting region in a muting subframe is indicated and one or more of a muting pattern group and a specific muting pattern is indicated.

1) Type 2-1: Configuring a Second Data Field so that Only a Muting Pattern is Indicated In a general determination of a muting pattern group, when antenna ports are 2 or 4, the determination is performed like antenna ports are 8. Therefore, the muted region becomes larger. That is, a muted RE increases, but overhead for configuring muting information and signaling decreases.

As described above, in Type 2-1, when a muting pattern is directly determined, a muting pattern is determined without determining a muting pattern group.

The muting pattern group is a pattern group that is configured with 8 REs like the case of 8 CSI-RS antenna ports in a CSI-RS pattern.

As to CSI-RSs which are basically applied to both of FS1 (FDD) and FS2 (TDD) and is a normal CP, when the number of CSI-RS antenna ports in one subframe is 8 as illustrated in FIG. 3, 5 CSI-RS patterns in total are defined, so a muting pattern group is one of five types. With respect to an extended CP, when one subframe has 8 CSI-RS antenna ports as illustrated in FIG. 7, 4 CSI-RS patterns in total are defined, so a muting pattern is one of four types.

As illustrated in FIGS. 11 and 13, as to a CSI-RS applied as an additional option in FS2 (TDD), with respect to a normal CP, if one subframe has 8 CSI-RS antenna ports, 3 CSI-RS patterns in total are defined, so a muting pattern group is one of 3 types. With respect to an extended CP, when one subframe has 8 CSI-RS antenna ports, 7 CSI-RS patterns in total are defined, so a muting pattern is one of 7 types.

In this circumstance, three detailed Types A to C for realizing Type 2-1 are described in detail.

A. Method 1 of Directly Indicating a Muting Pattern: Configuration is Made with 5 to 6 Bits Per Neighboring Cell as an Object of Each Muting In Type A of Type 2-1, a figure of information bit configuring a second data field may be 5 bits or 6 bits for indicating each of muting pattern×the number N of neighboring cells as objects of muting.

More specifically, as to CSI-RSs which are basically applied to both of FS1 (FDD) and FS2 (TDD) and are in the case of a normal CP, when the number of CSI-RS antenna ports in one subframe is 8 as illustrated in FIG. 3, 5 CSI-RS patterns in total are defined, so a total number of types of muting patterns is 5 when antenna ports are 8, 10 when antenna ports are 4, and 20 when antenna ports are 2. Therefore, a second data field can be configured to indicate 35 types of muting patterns in total with 6 bits.

For example, with respect to 0 to 63 of the bit value when expression is made with 6 bits, when the bit value is 0 to 4, 5 types of muting patterns when antenna ports are 8 are expressed, when the bit value is 5 to 14, 10 types of muting patterns when antenna ports are 4 are expressed, when the bit value is 15 to 34, 20 types of muting patterns when antenna ports are 2 are expressed, and the rest of the bit values of 35 to 63 are reserved.

In addition, as to CSI-RSs which are basically applied to both of FS1 (FDD) and FS2 (TDD) and are in the case of an extended CP, when the number of CSI-RS antenna ports in one subframe is 8 as illustrated in FIG. 7, 4 CSI-RS patterns in total are defined, so a total number of types of muting patterns is 4 when antenna ports are 8, 8 when antenna ports are 4, and 16 when antenna ports are 2. Therefore, a second data field can be configured to indicate 28 types of muting patterns in total with 5 bits. For example, with respect to 0 to 31 of the bit value when expression is made with 5 bits, when the bit value is 0 to 3, 4 types of muting patterns when antenna ports are 8 are expressed, when the bit value is 4 to 11, 8 types of muting patterns when antenna ports are 4 are expressed, when the bit value is 12 to 27, 16 types of muting patterns when antenna ports are 2 are expressed, and the rest of the bit values of 28 to 31 are reserved.

As illustrated in FIGS. 11 and 13, as to a CSI-RS applied as an additional option in FS2 (TDD), in the case of a normal CP, if one subframe has 8 CSI-RS antenna ports, 3 CSI-RS patterns in total are defined, so a total number of types of the muting patterns is 3 when antenna ports are 8, 6 when antenna ports are 4, and 12 when antenna ports are 2. Therefore, in a manner as described above, a second data field can be configured so that 19 types of muting patterns in total are indicated with 5 bits.

As to CSI-RSs applied as an additional option in FS2 (TDD), in the case of an extended CP, if one subframe has 8 CSI-RS antenna ports, 7 CSI-RS patterns in total are defined, so a total number of types of the muting patterns is 7 when antenna ports are 8, 14 when antenna ports are 4, and 28 when antenna ports are 2. Therefore, in a manner as described above, a second data field can be configured so that 49 types of muting patterns in total are indicated with 6 bits. Such a second data field may be configured differently from neighboring cell to neighboring cell as an object of muting.

In addition, in the above, muting information is configured and transmitted in a manner dividing into a case to be basically (generally) applied to FS1 and FS2 and a case to be optionally applied only to FS2. However, for convenience, the two cases may be combined and muting information is configured and transmitted at the same time. For example, in the case of a normal CP, 35 types of cases to be basically (generally) applied to FS1 and FS2 and 21 types of cases to be optionally applied only to FS2 are combined, and the 56 types are configured and transmitted with 6 bits. In this case, in FS2, as described above, 56 types are configured with 6 bits, but only the patterns to be basically (generally) applied exist in FS1. Therefore, in this case, only 35 types are configured with 6 bits. In order to apply the same system to FS1 and FS2, FS1 may have muting information configured with 6 bits in consideration of the 56 types.

In the case of an extended CP, patterns for cases to be optionally applied to FS2 already include patterns for cases to be basically (generally) applied to FS1 and FS2. Therefore, in the case of configuration as described above, both of FS1 and FS2 may have the muting information configured 6 bits in consideration of 49 types of cases.

B. Method 2 of Directly Indicating a Muting Pattern: Configuration is Made with 5 Bits Per Neighboring Cell as an Object of Each Muting In Type B of Type 2-1, a figure of information bit configuring a second data field may be 5 bits×the number N of neighboring cells as objects of muting.

More specifically, as to CSI-RS for a normal CP which are basically applied to both of FS1 (FDD) and FS2 (TDD), when the number of CSI-RS antenna ports in one subframe is 8 as illustrated in FIG. 3, 5 CSI-RS patterns in total are defined, so a total number of types of muting patterns is 5 when antenna ports are 8, 10 when antenna ports are 4, and 20 when antenna ports are 2. Therefore, 35 types of muting patterns in total are defined. However, CSI-RSs of a neighboring cell as an object of muting are not transmitted according to a pattern which at least CSI-RSs transmitted by a serving cell include or in which CSI-RSs are included. Therefore, considering this, a muting pattern of a neighboring cell substantially as an object of muting can be defined.

For example, when a serving cell transmits a CSI-RS with 8 antenna ports, the CSI-RS pattern for the 8 antenna ports may not be a CSI-RS pattern of a neighboring cell as an object of muting. Therefore, 7 types that the CSI-RS pattern of the serving cell includes among the total 35 types (a pattern which the CSI-RS pattern of the corresponding serving cell is 1 type of pattern when antenna ports are 8, 2 types of patterns when antenna ports are 4, 4 types of patterns when antenna ports are 2, and a total number of patterns by adding this is 7) may not be a CSI-RS pattern of a neighboring cell as an object of muting. The second data field may be configured so that the rest of 28 types of muting patterns are indicated with 5 bits.

In addition, when a serving cell transmits a CSI-RS with 4 antenna ports, the CSI-RS pattern for the 4 antenna ports may not be a CSI-RS pattern of a neighboring cell as an object of muting. Therefore, among the total 35 types, 4 types which the CSI-RS pattern of the serving cell includes or in which the CSI-RS pattern is included (Patterns which the CSI-RS pattern of the serving cell with 4 antenna ports includes are 1 pattern in the case of 4 antenna ports and 2 patterns in the case of 2 antenna ports. In addition, a pattern in which the CSI-RS pattern of the corresponding serving cell is included when the antenna ports are 4 is 1 pattern including the same among patterns having 8 antenna ports. Therefore, a total number of types of patterns adding the same is 4.) may not be CSI-RS patterns of a neighboring cell as an object of muting, and a second data field may be configured so that the rest of 31 types of muting patterns are indicated in a manner divided by 5 bits.

In addition, when the serving cell transmits a CSI-RS with 2 antenna ports, the CSI-RS pattern for the two antenna ports may not be CSI-RS patterns of a neighboring cell as an object of muting. Therefore, among the total 35 types, 3 types which the CSI-RS pattern of the serving cell include (Patterns which the CSI-RS pattern of the serving cell with 2 antenna ports includes are 1 pattern in case of 2 antenna ports. In addition, a pattern in which the CSI-RS pattern of the corresponding serving cell with 2 antenna ports is included is 1 pattern including the same among patterns having 8 antenna ports and 1 pattern including the same among patterns having 4 antenna ports. Therefore, a total number of types of patterns adding the same is 3.) may not be CSI-RS patterns of a neighboring cell as an object of muting, and a second data field may be configured so that the rest of 32 types of muting patterns are indicated in a manner divided by 5 bits.

In addition, as to CSI-RSs for an extended CP which are basically applied to both of FS1 (FDD) and FS2 (TDD), when the number of CSI-RS antenna ports in one subframe is 8 as illustrated in FIG. 7, 4 CSI-RS patterns in total are defined. At this point, in a manner as described above, when the serving cell transmits CSI-RSs with 8 antenna ports, a second data field may be configured so that 21 types except 7 types among the total 28 types when the serving cell transmits CSI-RSs with 8 antenna ports, 24 types except 4 types among the total 28 types when the serving cell transmits CSI-RSs with 4 antenna ports, and 25 types except 3 types among the total 28 types when the serving cell transmits CSI-RSs with 2 antenna ports are indicated in a manner divided by 5 bits, but like Type A described above, information of the total 28 types may be configured with 5 bits.

In the configuration, a case of a CSI-RS configuration applied as an additional option of FIGS. 10 to 13 may be excluded.

The configured second data field is respectively configured per neighboring cell as an object of muting.

C. Method 3 of Directly Indicating a Muting Pattern: Configuration is Made with a Bitmap of 12 to 28

In Type C of Type 2-1, a figure of information bit configuring a second data field may be one bit value of "12 to 28 bits in total".

The configuration of a second data field in each case is described as follows.

As to CSI-RSs for a normal CP which are basically applied to both of FS1 (FDD) and FS2 (TDD), when the number of CSI-RS antenna ports in one subframe is 8 as illustrated in FIG. 3, 5 CSI-RS patterns in total are defined, so 20 types of CSI-RS patterns are present in the case of 2 antenna ports.

If this is configured by a bitmap with 20 bits, information relating to REs to be muted substantially in one subframe regardless of the number of neighboring cells as objects of muting can be configured.

That is, with respect to each of total 20 patterns in the case of 2 antenna ports configured by 2 REs, when the bitmap information is 0, muting is performed and when the bitmap information is 1, data is transmitted (otherwise, data is transmitted when the bitmap information is 0, and muting is performed when the bitmap information is 1). If the number of CSI-RS antenna ports of a neighboring cell as an object of muting is 8, the case where the number of CSI-RS antenna ports as objects of muting is 4 includes 4 cases in which the number of CSI-RS antenna ports is 2, so the bitmap values for the 4 cases are set to be 0. Further, the case where the number of CSI-RS antenna ports as objects of muting is 4 includes two cases in which the number of CSI-RS antenna ports is 2. Therefore, the information may be configured by putting both of the bitmap values for the two cases to be 0.

As to CSI-RSs for an extended CP which are basically applied to both of FS1 (FDD) and FS2 (TDD), when the number of CSI-RS antenna ports in one subframe is 8 as illustrated in FIG. 7, 4 CSI-RS patterns in total are defined. At this point, in a manner as described above, the number of types of patterns for transmitting CSI-RSs with 2 antenna ports is 16, so this can be configured with bitmap information with 16 bits in a manner described above.

As illustrated in FIG. 11, as to CSI-RSs applied as an additional option in FS2 (TDD), in the case of a normal CP, 3 types of CSI-RS patterns in total are defined when the number of CSI-RS antenna ports in one subframe is 8. At this time, the number of types of patterns for transmitting CSI-RSs with 2 antenna ports is 12 in total. Therefore, in a manner as described above, this can be configured by bitmap information with 12 bits.

As illustrated in FIG. 13, as to CSI-RSs applied as an additional option in FS2 (TDD), in the case of an extended CP, 7 types of CSI-RS patterns in total are defined when the number of CSI-RS antenna ports in one subframe is 8. At this time, the number of types of patterns for transmitting CSI-RSs with 2 antenna ports is 28 in total. Therefore, in a manner as described above, this can be configured by bitmap information with 28 bits.

In addition, in the above, muting information is configured and transmitted in a manner dividing into a case to be basically (generally) applied to FS1 and FS2 and a case to be optionally applied only to FS2. However, for convenience, the two cases may be combined and muting information is configured and transmitted at the same time. That is, in the case of a normal CP, 20 types of cases to be basically (generally) applied to FS1 and FS2 and 12 types of cases to be optionally applied only to FS2 are combined, and the 32 types are configured and transmitted by a bitmap with 32 bits. In this case, in FS2, as described above, 32 types are configured with 32 bits, but only the patterns to be basically (generally) applied are present in FS1. Therefore, in this case, only 20 types are configured with 20 bits. In order to apply the same system to FS1 and FS2, FS1 may have muting information configured by a bitmap with 32 bits in consideration of the 32 types.

In the case of an extended CP, patterns for cases to be optionally applied to FS2 already include patterns for cases to be basically (generally) applied to FS1 and FS2. Therefore, in the case of configuration as described above, both of FS1 and FS2 may have the muting information configured 28 bits in consideration of 28 types of cases.

2) Type 2-2: Configuring a Second Data Field so that Only a Muting Pattern Group is Indicated In Type 2-2 of configuring a second data field so that only a muting pattern group is indicated, the second data field is configured with "3 to 7 bits in total" (5 bits when it is basically applied to both of FS1 (FDD) and FS2 (TDD) and is in the case of a normal CP).

Type 2-2 like this is not a method of muting only specific muting patterns in a muting pattern group according to the number of antenna ports, but a method of muting all REs in the determined muting pattern group.

The configuration of a second data field in each case is described as follows.

As to CSI-RSs for a normal CP which are basically applied to both of FS1 (FDD) and FS2 (TDD), when the number of CSI-RS antenna ports in one subframe is 8 as illustrated in FIG. 3, 5 CSI-RS patterns in total are defined. At this point, the number of patterns for transmitting CSI-RSs with 8 antenna ports is 5 in total. Therefore, a second data field may be configured by bitmap information with 5 bits, and information relating to REs to be muted substantially in one subframe regardless of the number of neighboring cells as objects of muting can be configured. That is, each of total 5 patterns in the case of 8 antenna ports configured by 8 REs is configured by a bitmap with 5 bits, when the bitmap information is 0, muting is performed and when the bitmap information is 1, data is transmitted (otherwise, data is transmitted when the bitmap information is 0, and muting is performed when the bitmap information is 1).

In this manner, if a muting region is determined by a muting pattern group, when each neighboring cell as an object of muting transmits CSI-RSs with 2 or 4 antenna ports, muting is performed like the case of antenna ports. Therefore, substantially more regions become regions as objects of muting.

That is, since muted RE regions become large, there is a problem of decreasing regions to which data can be transmitted. However, there is an advantage of reducing overhead for configuring and signaling muting information.

As to CSI-RSs for an extended CP which are basically applied to both of FS1 (FDD) and FS2 (TDD), when the number of CSI-RS antenna ports in one subframe is 8 as illustrated in FIG. 7, 4 CSI-RS patterns in total are defined. At this point, the number of types of patterns for transmitting CSI-RSs with 8 antenna ports is 4, so a second data field can be configured with bitmap information with 4 bits in a manner described above.

As illustrated in FIG. 11, as to CSI-RSs for a normal CP which are applied as an additional option in FS2 (TDD), 3 types of CSI-RS patterns in total are defined when the number of CSI-RS antenna ports in one subframe is 8. At this time, the number of types of patterns for transmitting CSI-RSs with 8 antenna ports is 3 in total. Therefore, in a manner as described above, a second data field can be configured by bitmap information with 3 bits.

As illustrated in FIG. 13, as to CSI-RSs for an extended CP applied as an additional option in FS2 (TDD), 7 types of CSI-RS patterns in total are defined when the number of CSI-RS antenna ports in one subframe is 8. At this time, the number of types of patterns for transmitting CSI-RSs with 8 antenna ports is 7 in total. Therefore, in a manner as described above, a second data field can be configured by bitmap information with 7 bits.

In the above, a method of muting all REs in the determined muting pattern group, not a method of muting only specific patterns in a muting pattern group, is applied. At this point, a muting pattern group as a reference is based on 8 antenna ports, but it may be based on 4 CSI-RS antenna ports.

The muting information generated as above may be transmitted by an upper layer signaling such as RRC, may be dynamically transmitted by PDCCH in L1 layer, or may be signaled through MAC in L2 layer.

One or more of the cases described above may be selectively adopted according to the specification of a communication system to which the present embodiment is applied for determining a muting region and generating muting information according to the present embodiment.

For example, depending on the type of the communication system, one or more of various types for configuring first and second steps are combined to configure the present invention.

In other words, the present invention may be configured not by adopting all detailed types in the first and second steps described above, but by combining one or more of various types configuring the first and second steps according to a specification of a communication system, a configuration of a CSI-RS, a CSI-RS pattern, the number of CSI-RS antenna ports, a CSI-RS transmission cycle, a CSI-RS transmission subframe offset, or the like.

Figure 17:
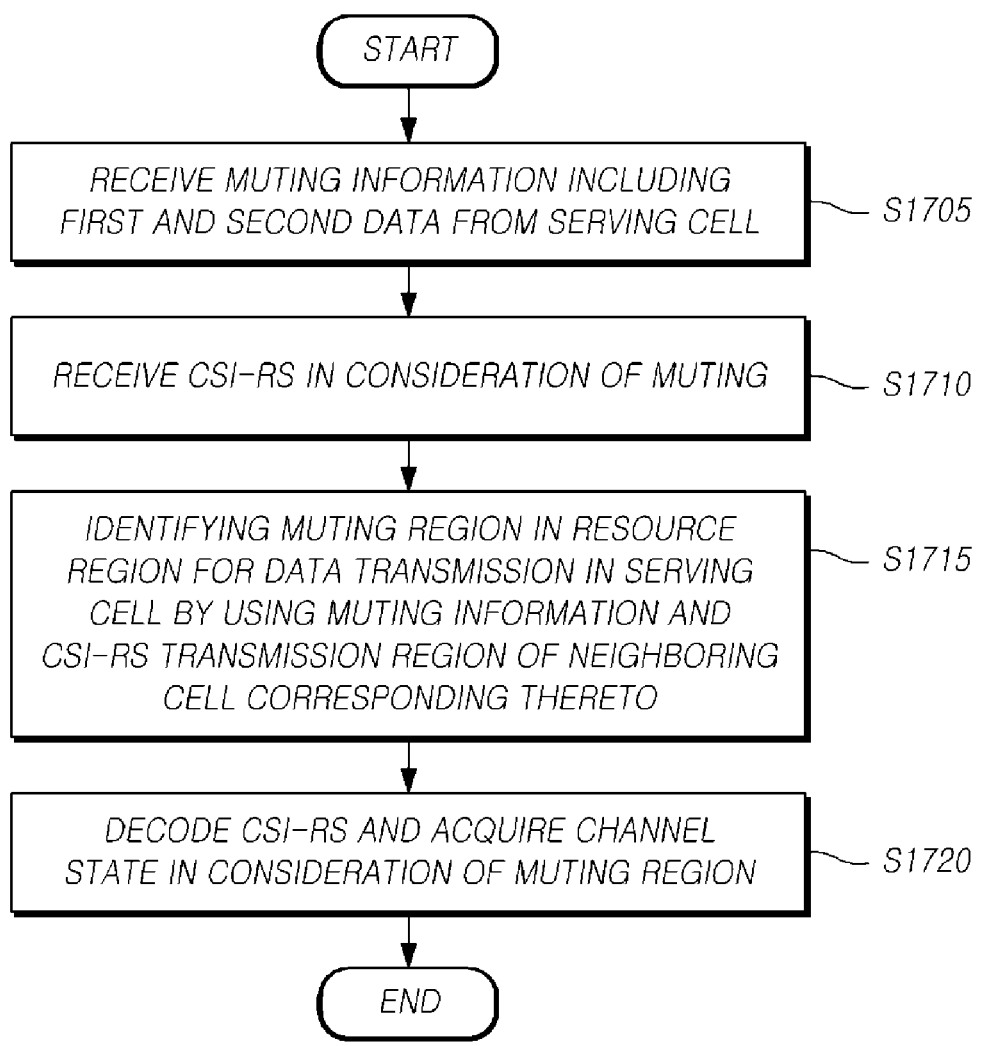
FIG. 17 is a flowchart illustrating a method of acquiring channel information in a user equipment using muting information according to the present embodiment.

FIG. 17 is a flowchart illustrating a method of acquiring channel information in a user equipment using muting information according to the present embodiment.

A method for acquiring channel information according to the present embodiment is to acquire channel information by receiving a CSI-RS signal from two or more cells (base station). Generally, the method is performed at a user equipment or at a UE, but the method is not limited thereto.

A method for acquiring channel state includes a step of receiving muting information including a first data field that indicates a muting duty cycle and a muting offset from a serving cell among two or more cells and a second data field that indicates one or more of a muting pattern group in one muting subframe and a specific muting pattern (S1705), a step of receiving CSI-RSs in consideration of muting (S1710); a step of identifying a muting region in a resource region for data transmission in the serving cell by using the muting information and identifying a CSI-RS transmission region of a neighboring cell corresponding thereto (S1715); and a step of acquiring a channel state by decoding and estimating CSI-RSs of the serving cell and the neighboring cell in consideration of the muting region (S1720).

In Step S1710, receiving CSI-RSs in consideration of muting means receiving CSI-RSs of a neighboring cell transmitted from a resource region of a neighboring cell corresponding to a partial region muted by the muting information among a resource region (PDSCH) for transmitting CSI-RSs of the serving cell and the data of the serving cell.

The muting information received from the serving cell in Step S1705 is information indicating a region which is overlapped with CSI-RSs of the neighboring cell and to which data is not transmitted. The muting information may be configured by the first and second data field described in relation to FIGS. 2 to 16.

Steps S1705 and S1710 described above may be configured with its sequence changed, or realized with the steps combined into one.

A CSI-RS signal received from the serving cell and the neighboring cell is a reference signal (a CSI-RS of the serving cell) already generated in a region allocated in the serving cell for transmitting a CSI-RS or a reference signal (a CSI-RS of the neighboring cell) generated in the resource region of the neighboring cells corresponding to a region to which muting which implies non-transmission of data or zero power transmission in a resource region (PDSCH) for transmitting data of the serving cell to match with the muting information as described above is applied.

The process of identifying a muting region in Step S1715 may include a step of confirming a subframe in which a muting region is present by identifying a muting duty cycle and a muting offset using a first data field value of the received muting information; a step of determining a muting pattern group or a specific muting pattern in the muting subframe using a second data field value; and a step of determining a muting region using the determined muting pattern group or the determined specific muting pattern, but the process is not limited thereto.

In Step S1720 of acquiring a channel state of the serving cell and the neighboring cell in consideration of a muting region, decoding is performed in a manner of not considering REs which are muting regions at the time of decoding when the user equipment decodes data received from the serving cell, a reference signal is decoded by decoding CSI-RSs of the neighboring cell which are received from a region corresponding to the muted resource region and CSI-RSs of the serving cell which are received in advance, and then a channel state is measured and acquired from them. According to this, the efficiency for decoding CSI-RSs may be improved, and a CSI-RS of each cell can be correctly decoded by eliminating intervention from a CSI-RS of the neighboring cell. Therefore, correct channel estimation becomes possible.

Figure 18:
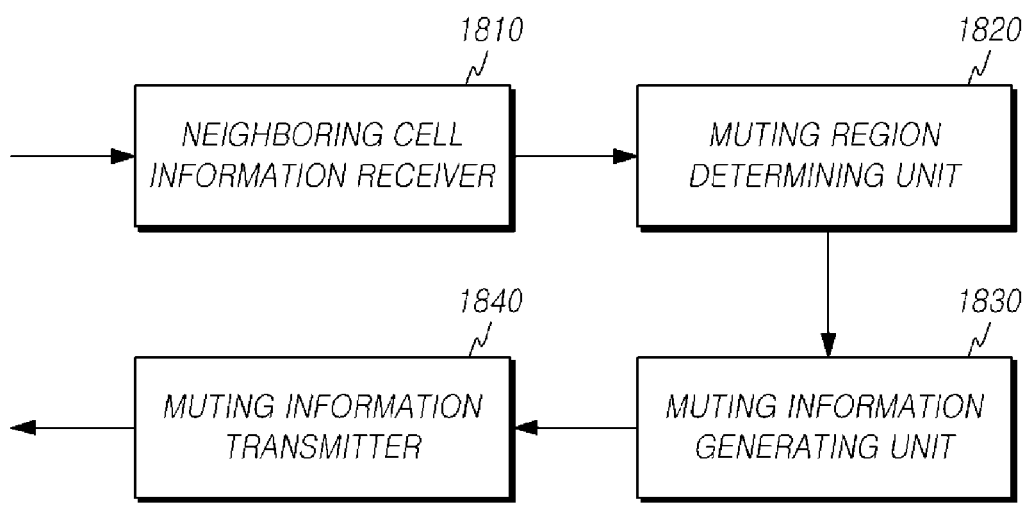
FIG. 18 is a block diagram illustrating a CSI-RS muting information transmission apparatus according to the present embodiment.

FIG. 18 is a block diagram illustrating a configuration of a CSI-RS muting information transmission apparatus according to the present embodiment.

It is general that the CSI-RS muting information transmission apparatus according to the present embodiment is realized in the serving cell of the multicell environment or the serving base station, or in association with the multicell environment or the serving base station. The CSI-RS muting information transmission apparatus is not limited thereto.

The CSI-RS muting information transmission apparatus according to the present embodiment may include a neighboring cell information receiver 1810 that receives neighboring cell information including one or more of a CSI-RS pattern, the number of CSI-RS antenna ports, a CSI-RS transmission cycle (Duty Cycle), and CSI-RS transmission subframe offset information from one or more neighboring cells in a multicell environment; a muting region determining unit 1820 that determines a muting region which is a time/frequency resource region that overlaps with CSI-RSs of the corresponding neighboring cell in a resource space thereof and therefore requires muting based on the neighboring cell information; a muting information generating unit 1830 that generates muting information including a first data field which indicates the muting region and indicates a muting duty cycle and a muting offset and a second data field which indicates one or more of a muting pattern group and a specific muting pattern in one muting subframe; and a muting information transmitter 1840 that transmits the generated muting information to a user equipment (UE) that receives a CSI-RS.

The neighboring cell information receiver 1810 performs a function of receiving one or more units of information among CSI-RS patterns of each neighboring cell, the number of CSI-RS antenna ports, a CSI-RS transmission cycle, and CSI-RS transmission subframe offset information from neighboring cells (Cell B and Cell C in FIG. 14) which is to transmit CSI-RSs thereof to a specific user equipment in a multicell environment such as CoMP.

The muting region determining unit 1820 performs a function of determining a muting region which is a time/frequency region that overlaps with CSI-RSs of the corresponding neighboring cell in a resource space thereof and therefore requires muting for transmitting data of a serving cell based on the neighboring cell information received from the neighboring cell.

The muting information generating unit 1830 generates muting information that indicates a muting region determined by a muting region determining unit. In detail, as described in relation to FIGS. 2 to 16, a first data field which indicates a muting duty cycle and a muting offset and a second data field which indicates one or more of a muting pattern group and a specific muting pattern in one muting subframe are generated and combined to generate final muting information.

Such first and second data fields can be determined by types of combining one or more of various types in the first and second steps as described in relation to FIG. 16. To avoid an overlapped description, a detailed description is omitted.

As an example of the muting information, it is assumed that a communication system to which the present embodiment is applied has conditions as follows.

1) Condition of the first step: The muting offset is identical to CSI-RS transmission offset of the serving cell (base station) (It is assumed that the offset is 3), the muting duty cycle is a multiple of the CSI-RS transmission cycle of the serving cell (base station), M=4, and signaling is separately performed by $\lceil \log_2 M \rceil = 2$ bits with respect how many bits the number of information bits configuring the first data field is (as a result, this corresponds to Type 2-1 in the first step described above, 6 bits in total)

2) Condition of the second step: This is a case where it is assumed that a second data field is configured so that a specific muting pattern is directly indicated, the second data field is basically applied to both of FS1 (FDD) and FS2 (TDD) and is in the case of a normal CP, the number of CSI-RS antenna ports is 8, and total 35 types of patterns (5 types for 8 antennas, 10 types for 4 antennas, and 20 types for 2 antennas) are indicated with 6 bits (As a result, this corresponds to Type A in Type 2-1 of 2 steps described above; it is assumed that there are 6 bits in total, Pattern b is a muting pattern in the case of 8 antennas, and this is expressed with "000001")

In this circumstance, muting information includes a bit value of a first data field with 6 bits and a bit value of a second data field with 6 bits. This is configured as illustrated in FIG. 19.

Figure 19:
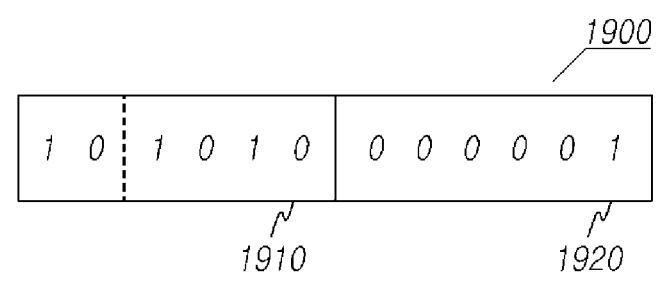

That is, FIG. 19 illustrates an example of data format of muting information according to the present invention.

If it is assumed that the first and second conditions described above, the muting information 1900 according to the present embodiment includes a first data field region 1910 configured with 6 bits of "101010" and a second data field 1920 configured with 6 bits of "000001".

If the meaning of each data field value is described in detail, a field value of the first data field region 1910 configured with 6 bits of "101010" may be subdivided into 2 bit value ($\log_2$ M=2) of "10" indicating a configuration bit value (M=4) and a region with 4 bits of "1010" indicating an actual muting duty cycle and a muting offset.

As a result, the value of the first data field "101010" has a muting duty cycle of 40 ms which is 4 times of a CSI-RS transmission cycle of a serving cell (10 ms), and indicates that a muting subframe is present in the second and fourth CSI-RS transmission cycle. (It is assumed that "0" means muting ON, and "1" means muting OFF) In addition, according to the condition of the first step, since the muting offset is 3, this means that a fourth subframe (subframe number 3) in the second and fourth CSI-RS transmission cycle is a muting subframe.

In addition, since the second data field value is "000001", this indicates Pattern b in which the number of CSI-RS antenna ports of the corresponding neighboring cell is 8 and which is the second pattern among 5 CSI-RS patterns in total illustrated in FIG. 3, among possible 35 types of patterns in total (5 types of 8 antennas, 10 types of 4 antennas, and 20 types of 2 antennas) when the second data field is basically applied to both of FS1 (FDD) and FS2 (TDD) and is in the case of a normal CP. (Patterns a to e with 8 antennas as illustrated in FIG. 3 are indicated with "000000", "000001", "000010", "000011", and "000100", and Patterns a to j with 4 antennas as illustrated in FIG. 4 are indicated with "000101", "000110", "000111", . . . , or the like, in sequence)

It is assumed that the muting information as illustrated in FIG. 19 considers only one neighboring cell. If the muting information is configured separately for two or more neighboring cells in a separate manner, muting information corresponding to the number N of the neighboring cells is respectively generated.

Figure 20:
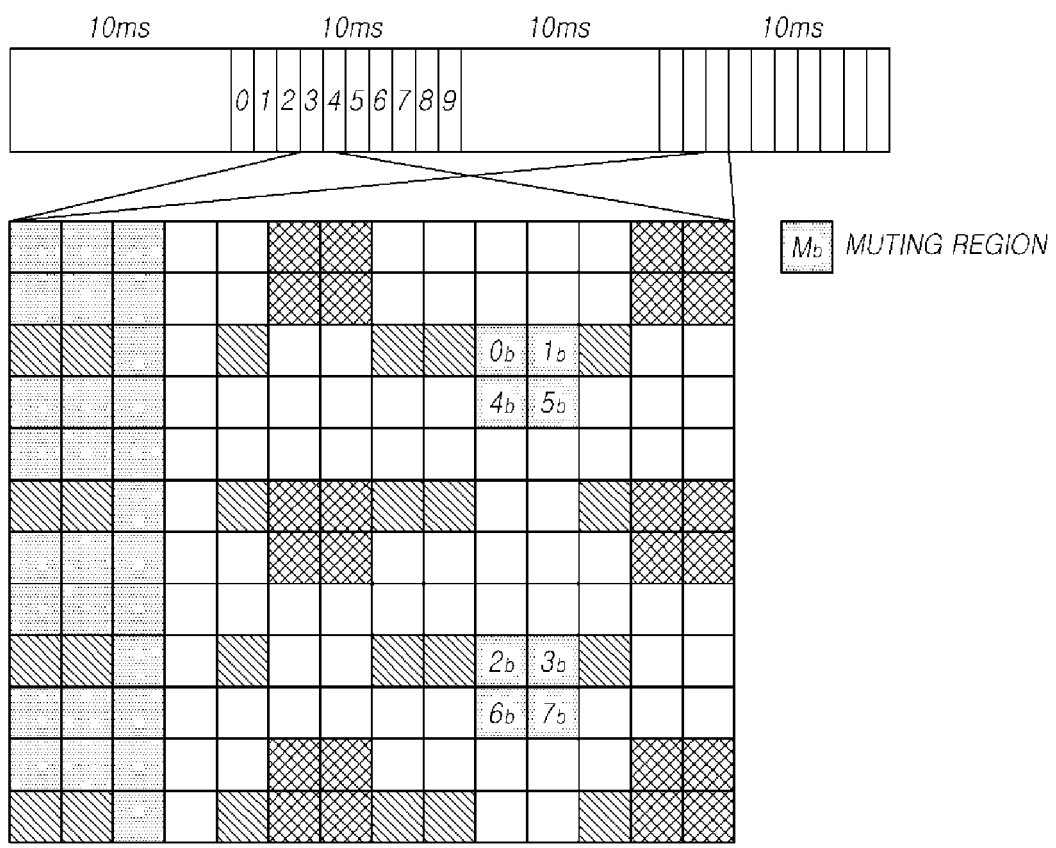
FIG. 20 is a diagram illustrating a configuration of frames and resource spaces indicating a state in which CSI-RSs of the actual serving cell is muted based on muting information of FIG. 19.

FIG. 20 is a diagram illustrating a configuration of frames and resource spaces indicating a state in which CSI-RSs of the actual serving cell are muted based on muting information of FIG. 19.

According to the muting information of FIG. 19, in the second and fourth CSI-RS transmission cycle, a fourth subframe (subframe number is 3) becomes a muting subframe and in the resource space in the subframe, REs corresponding to Pattern b of FIG. 3 (indicated with dark shadows in FIG. 20) become muting regions, and in the region, muting which is non-allocation of data or zero power transmission is performed. This can be indicated with a frame configuration diagram illustrated in FIG. 20.

Figure 21:
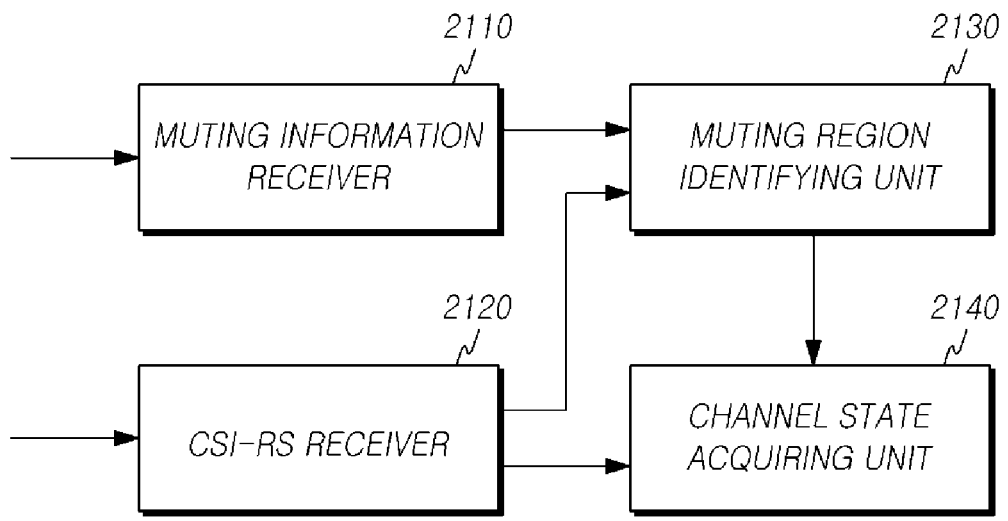
FIG. 21 is a diagram illustrating a configuration of a channel state acquiring apparatus using muting information according to the present embodiment.

FIG. 21 is a diagram illustrating a configuration of a channel state acquiring apparatus using muting information according to the present embodiment.

The channel information acquiring apparatus according to the present embodiment acquires channel information by receiving a CSI-RS signal from two or more cells (base station). Generally, the channel information acquiring apparatus is realized in the user equipment or the UE, or in association with the same, but it is not limited thereto.

The channel state acquiring apparatus according to the present embodiment may include a muting information receiver 2110 that receives muting information including a first data field indicating a muting duty cycle and an muting offset and a second data field indicating one or more of a muting pattern group and a specific muting pattern in one muting subframe from a serving cell among two or more cells, a CSI-RS receiver 2120 that receives a CSI-RS signal in consideration of muting from the serving cell and the neighboring cell, a muting region identifying unit 2130 that identifies a muting region where data is not received (or data with zero power is received) and a CSI-RS signal of the neighboring cell is transmitted with being muted, among the resource space (PDSCH) for data transmission in consideration of the muting information; a channel state acquiring unit 2140 that acquires a channel state by decoding the CSI-RS signal in consideration of the muting region.

The muting information received from the serving cell is information indicating a region which is overlapped with CSI-RSs of a neighboring cell and to which data is not to be transmitted, and the muting information can be configured with the first and second data fields described in relation to FIGS. 2 to 16.

The muting information receiver 2110 performs a function of receiving muting information which is generated and transmitted by the serving cell according to one or more combined methods among various methods in the first to second steps described above, and the muting information may have a format as illustrated in FIG. 19 or the like, but the muting information is not limited thereto.

The CSI-RS receiver 2120 performs a function of receiving a CSI-RS signal from the serving cell and the neighboring cell, and the CSI-RS signal received from the serving cell and the neighboring cell is a reference signal (a CSI-RS of a serving cell) already generated in a region allocated in the serving cell in order to transmit a CSI-RS or a reference signal (a CSI-RS of a neighboring cell) generated in a resource region from neighboring cells corresponding to a region to which muting is applied which implies non-transmission of data from a resource space (PDSCH) for data transmission of a serving cell so as to be match with the muting information described above or zero power transmission.

The muting region identifying unit 2130 performs a function of identifying a muting region for the serving cell using the muting information received from the serving cell, and more specifically a step of confirming a subframe in which a muting region is present by identifying a muting duty cycle and a muting offset using a value of a first data field of the received value of the muting information; a step of deciding a muting pattern group and a specific muting pattern using a value of a second data field in the corresponding muting subframe; and a step of deciding a muting region using a determined muting pattern or a muting pattern group. However, the muting region identifying unit is not limited thereto, and the muting region may be identified according to the principles as illustrated in FIGS. 19 and 20.

The channel state acquiring unit 2140 may acquire a channel state by performing decoding in a manner of considering the muting region and not considering REs, which are muting regions, at the time of decoding data received from the serving cell by a user equipment, decoding CSI-RSs of the neighboring cells and a CSI-RS of the serving cell received from resource regions of the neighboring cells corresponding to the muted resource regions to decode a reference signal, and measuring a channel state from the reference signal.

Accordingly, the efficiency of decoding of a CSI-RS may be improved, a CSI-RS of each cell can be correctly decoded by eliminating intervention from a CSI-RS of the neighboring cell, and therefore the correct channel estimation becomes possible.

In a configuration of muting information according to the present embodiment and a technology of acquiring a channel state using thereof, all methods or technologies illustrated in FIGS. 2 to 16 can be used, and detailed description thereof is omitted to avoid an overlapped description.

Figure 22:
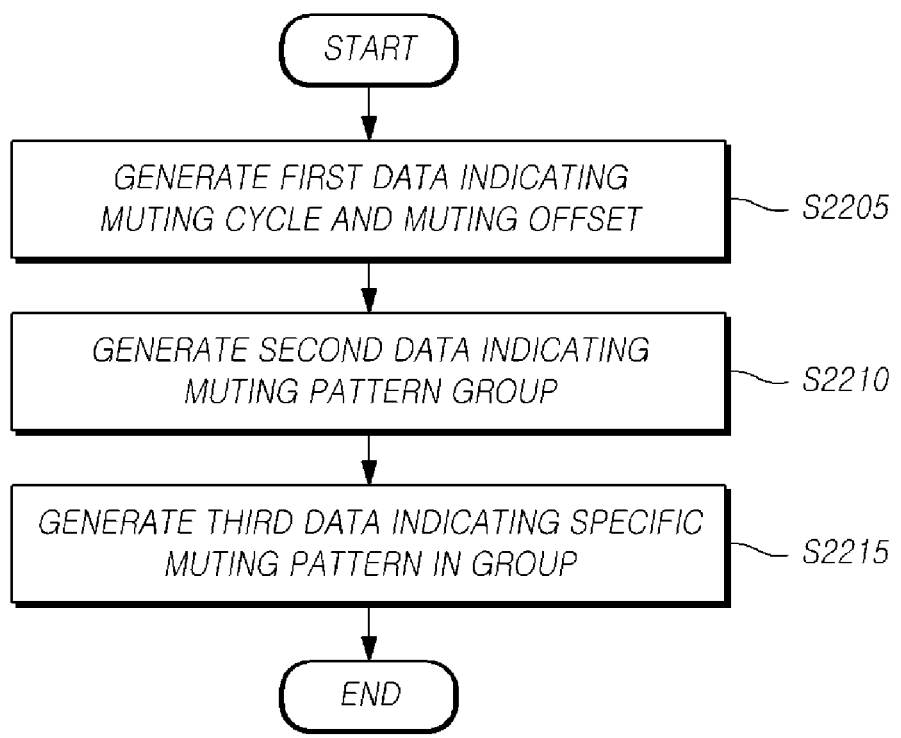
FIG. 22 is a flowchart illustrating a detailed configuration relating to steps of generating muting information according to another embodiment of the present invention.

FIG. 22 is a flowchart illustrating a detailed configuration relating to steps of generating muting information according to another embodiment of the present invention.

The embodiment of FIG. 22 is different from the embodiment of FIG. 16 in that the step of generating muting information in FIG. 15 includes a first step S2205 of generating a first data field for determining and indicating a muting duty cycle and a muting offset, a second step S2210 of generating a second data field for determining and indicating muting pattern group information relating to one subframe, and a third step S2215 of generating a third data field for determining and indicating a specific muting pattern in the determined muting pattern group.

That is, in the embodiment of FIG. 16, muting information indicating a muting region to which data is not transmitted from a base station, which corresponds to a serving cell and performs zero power transmission is configured by two steps in total. However, in the embodiment of FIG. 22, the muting information is configured by 3 steps in total. Among the 3 steps, the first step may be performed at the first time, but it may be performed after the second and third steps are performed. Further, the information configured through the first to third steps is signaled to a user equipment (UE), and the corresponding cell performs muting which indicates zero power transmission by not transmitting data to a muting pattern from each neighboring cell in a subframe corresponding to a muting offset per corresponding muting duty cycle based on the muting information.

Herein below, the overall configurations of the first to third steps configuring muting information, that is, the steps of configuring muting information, the types of the configured information and the number of bits will be described in detail.

However, in the embodiment of FIG. 22, the first step of determining a muting duty cycle and a muting offset and generating a first data field indicating the muting duty cycle and the muting offset is the same as the first step in the embodiment of FIG. 16. Therefore, the description thereof is omitted to avoid overlapping. Herein below, a description will be made only to detailed configurations relating to a second step S2210 of generating a second data field for determining and indicating muting pattern group information for one subframe and a third step S2215 of generating a third data field for determining and indicating a specific muting pattern in the determined muting pattern group.

Second Step in the Embodiment of FIG. 22

Herein below, each case of the second step S2210 of generating a second data field for determining and indicating muting pattern group information is described.

The second step means configuring a second data field for indicating muting pattern group in one subframe as muting information.

The muting pattern group is a pattern group including 8 REs like the case of 8 CSI-RS antenna ports in a CSI-RS pattern. In a general case where the same application is performed to FS1 (Frame Structure 1, FDD) and FS2 (Frame Structure 2, TDD (excluding DwPTS of special subframe)), for a normal CP, when the number of CSI-RS antenna ports for one subframe is 8 as illustrated in FIG. 3, 5 CSI-RS patterns in total are defined, so the muting pattern group is one of 5 types. For an extended CP, when the number of CSI-RS antenna ports for one subframe is 8 as illustrated in FIG. 7, 4 CSI-RS patterns in total are defined, so the muting pattern group is one of 4 types.

As in FIGS. 11 and 13, in FS2 (Frame Structure 2, TDD (excluding DwPTS of special subframe)), as to a CSI-RS pattern defined as an additional option, for a normal CP, when the number of CSI-RS antenna ports for one subframe is 8, 3 CSI-RS patterns in total are defined, so the muting pattern group is one of 3 types. For an extended CP, when the number of CSI-RS antenna ports for one subframe is 8, 7 CSI-RS patterns in total are defined, so the muting pattern group is one of 7 types.

In this case, a value of the second data field configuring the second step may be realized by dividing into two cases of "1)" and "2)" as described below according to whether the communication system is based on cell ID or a pattern group ID.

1) Based on Cell ID

In this case, the number of information bits configuring the second data field may be 0 bit.

When cell IDs of neighboring cells an objects of muting are known (for example, when neighboring cells as objects of muting consist of a CoMP set, and the CoMP sets know cell IDs of each other), CSI-RS patterns of the neighboring cells as objects of muting can be known based on the cell IDs (when CSI-RS patterns in the case of 8 CSI-RS antenna ports are determined based on the cell IDs). According to this, the muting pattern groups can be known per neighboring cell as an object of each muting. Therefore, in order to specify a muting pattern group, separate additional data may not be required. The case of "2)" where a muting pattern group is defined by a pattern group ID may be subdivided into two types, and these are defined as Methods 2-1 and 2-2.

2) Based on Pattern Group ID 2-1) Method 2-1

In this case, the number of information bits configuring the second data field may be "the number N of neighboring cells as objects of muting×2 to 3 bits".

Method 2-1 relates to a case where CSI-RS patterns (relating to a case of 8 antenna ports) of neighboring cells as objects of muting are configured based on pattern group IDs. That is, for a normal CP in a general case, 5 CSI-RS patterns in total for one subframe are defined when the number of CSI-RS antenna ports is 8 as illustrated in FIG. 3. Therefore, the muting pattern group is one of 5 types and muting pattern groups are named into pattern group IDs from 0 to 4 and transmitted with 3 bits. (5 to 7 of the remaining bit values in the bit values of 3 bits are reserved.)

For an extended CP in a general case, 4 CSI-RS patterns in total are defined when the number of CSI-RS antenna ports for one subframe is 8 as illustrated in FIG. 7. Therefore, the muting pattern group is one of 4 types and muting pattern groups are named into pattern group IDs from 0 to 3 and transmitted with 2 bits.

As in FIGS. 11 and 13, in FS2 (Frame Structure 2, (excluding DwPTS of special subframe)), as to a CSI-RS pattern defined as an additional option, for a normal CP, when the number of CSI-RS antenna ports for one subframe is 8, 3 CSI-RS patterns in total are defined, so the muting pattern group is one of 3 types. Therefore, muting pattern groups are named into pattern group IDs from 0 to 2 and transmitted with 2 bits. (3 of the remaining bit value in the bit values of 2 bits are reserved.) For an extended CP, when the number of CSI-RS antenna ports for one subframe is 8, 7 CSI-RS patterns in total are defined, so the muting pattern group is one of 7 types. Therefore, muting pattern groups are named into pattern group IDs from 0 to 6 and transmitted with 3 bits. (7 of the remaining bit value in the bit values of 3 bits are reserved.) The configured information can be respectively configured per neighboring cell as objects of muting.

In FS1 of the normal CP, only 5 patterns in a general case are present. Therefore, a method for configuring and transmitting the 5 patterns with 3 bits has been described. In addition, in FS2, generally defined 5 patterns and optionally defined 3 patterns are defined as different cases, respectively. A method of transmitting the 5 patterns and the 3 patterns with 3 bits and 2 bits respectively is described. However, the two cases are combined and 8 patterns in total are configured and transmitted with 3 bits.

2-2) Method 2-2

In Method 2-2, the number of information bits configuring the second data field may be "the number N of neighboring cells as objects of muting×2 bits".

In Method 2-2, a case of an additional option as in FIGS. 10 to 13 is not considered, only general cases of FIGS. 2 to 9 are considered, and for a normal CP as in FIG. 3, 5 CSI-RS patterns in total are defined when the number of CSI-RS antenna ports for one subframe is 8. At this time, a CSI-RS pattern of the serving cell (a case of 8 antenna ports) is excluded, and there are 4 cases, and these are expressed with 2 bits. For example, when possible CSI-RS patterns in one subframe in total (a case of 8 antenna ports) are 5 of "a", "b", "c", "d", and "e", and the CSI-RS pattern of the serving cell (a case of 8 antenna ports) is "c", Pattern "d", which is the next pattern becomes a muting pattern group if the bit value is "00", Pattern "e", which is the next pattern becomes a muting pattern group if the bit value is "01", Pattern "a", which cyclically turns to the next pattern of Pattern "e" becomes a muting pattern group if the bit value is "10", and Pattern "b", which is the next pattern of Pattern "a" becomes a muting pattern group if the bit value is "11".

In addition, as in FIG. 7, for an extended CP, when the number of CSI-RS antenna ports for one subframe is 8, 4 CSI-RS patterns in total are defined. As to the 4 possible CSI-RSs, in the same manner as the case of the normal CP of the present method, a CSI-RS pattern of the serving cell (a case of 8 antenna ports) is excluded, and 3 muting pattern groups are configured as 2-bit information. Otherwise, a CSI-RS pattern (a case of 8 antenna ports) is not excluded, and 4 muting pattern groups are configured as 2-bit information. The configured information can be respectively configured per neighboring cell as an object of muting.

Third Step in the Embodiment of FIG. 22

Herein below, a detailed configuration of the third step S2215 of generating a third data field for determining and indicating a specific muting pattern in the determined muting pattern group is described.

The third step is a process of configuring information on a concrete specific muting pattern to be substantially muted in consideration of the number of CSI-RS transmission antennas of a neighboring cell as an object of muting after a muting pattern group in one subframe is identified.

In this case, as in the second step, the field value configuring the third data field may be 0 bit when a communication system is based on a cell ID, or may be 3-bit information when a UE of the serving cell does not know a correct muting pattern of a neighboring cell as an object of muting in advance.

Herein below, a method of configuring the third data field will be described by dividing into a case where a communication system is based on a cell ID and a case where a UE of a serving cell does not know a correct muting pattern of a neighboring cell as an object of muting.

1) Based on Cell ID

In this case, the number of bits configuring the third data field may be 0 bits.

That is, a case where a cell ID of a neighboring cell as an object of muting is known in advance (for example, when neighboring cells as objects of muting configures a CoMP set, and the CoMP sets know cell IDs of each other), and a case where patterns of the neighboring cells as objects of muting can be known based on the cell IDs and the CSI-RS pattern is not a grouped pattern for a case of 8 antenna ports, but patterns even for cases of 2 or 4 antenna ports are specifically known. That is, in the case where CSI-RS patterns for cases of 2, 4, and 8 antenna ports are specifically determined based on cell IDs, not only a muting pattern group but also specific muting patterns per neighboring cell as an object of each muting can be known according to this. Therefore, additional data is not required for indicating a specific muting pattern in a group according to the number of antenna ports.

2) A Case where a UE of a Serving Cell does not Know a Correct Muting Pattern of a Neighboring Cell as an Object of Muting in Advance In this case, the number of information bits configuring the third data field may be 3 bits.

That is, in this method, when a UE in a serving cell does not know a correct muting pattern of a neighboring cell as an object of muting in advance, the serving cell should inform the corresponding UE of the correct muting pattern. That is, as to a muting group pattern determined in the second step (regardless of the determined muting group pattern is based on cell IDs or based on pattern group IDs), there will be one specific muting pattern in the case of 8 antenna ports, 2 specific muting patterns in the case of 4 antenna ports, and 4 specific muting patterns in the case of 2 antenna ports.

Therefore, 3-bit information is configured for the 7 cases in total. The configured information can be respectively configured per neighboring cell as objects of muting.

The muting information generated as above may be transmitted by an upper layer signaling such as RRC, may be dynamically transmitted by PDCCH in L1 layer, or may be signaled through MAC in L2 layer in some cases.

One or more of the cases described above may be selectively adopted according to the specification of a communication system to which the present embodiment is applied for determining a muting region and generating muting information according to the present embodiment.

For example, depending on the type of the communication system, one or more of various types for configuring first and second steps are combined to configure the present invention.

In other words, the present invention may be configured not by adopting all detailed types in the first to third steps described above, but by combining one or more of various types configuring the first to third steps according to a specification of a communication system, a configuration of a CSI-RS, a CSI-RS pattern, the number of CSI-RS antenna ports, a CSI-RS transmission cycle, a CSI-RS transmission subframe offset, or the like.

Figure 23:
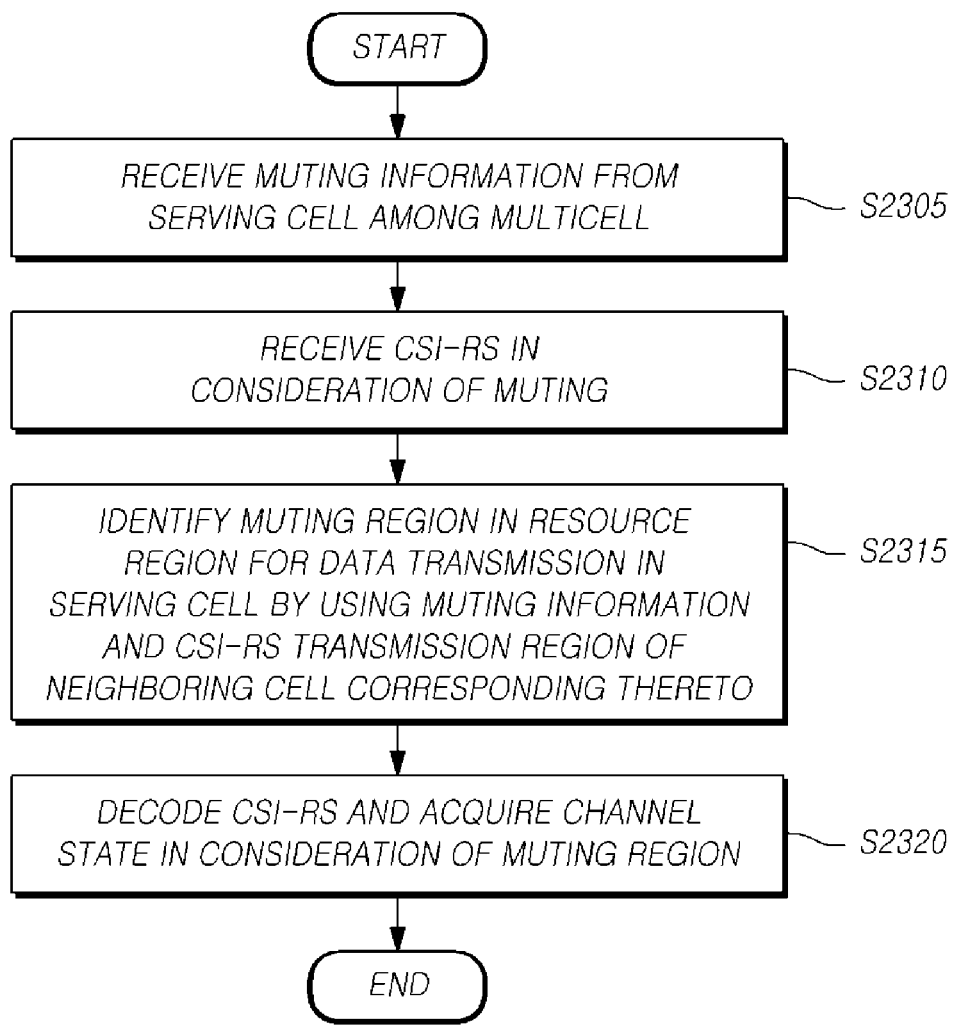
FIG. 23 is a flowchart illustrating a method for acquiring channel information in a user equipment using muting information according to an embodiment of FIG. 22; and That is.

FIG. 23 is a flowchart illustrating a method for acquiring channel information in a user equipment using muting information according to an embodiment of FIG. 22.

The method for acquiring channel information according the present embodiment is to acquire channel information by receiving a CSI-RS signal from two or more cells (base station). Generally, the method is performed in a user equipment or a UE, but the method is not limited thereto.

The method for acquiring channel state according to the present embodiment may include a step S2305 of receiving muting information from a serving cell among two or more cells, a step S2310 of receiving CSI-RSs in consideration of muting, a step S2315 of identifying a muting region in a resource space for data transmission of the serving cell using the muting information and identifying a CSI-RS transmission region of the neighboring cell corresponding thereto, and a step S2320 of acquiring a channel state by decoding or estimating CSI-RSs of the serving cell or the neighboring cell in consideration of the muting region.

The muting information received from the serving cell in S2305 is information indicating a region which is overlapped with CSI-RSs of the neighboring cell and to which data is not to be transmitted, and the muting information can be configured with the first to third data fields described in relation to FIGS. 2 to 15 and 22.

The steps S2305 and S2310 described above will be configured with its sequence changed, or realized with the steps combined into one.

A method for identifying the muting region in S2315 may include a step of confirming a subframe in which a muting region is present by identifying a muting duty cycle and a muting offset using a value of the first data field of the received muting information, a step of determining a muting pattern group in the corresponding muting subframe using a value of the second data field, a step of a specific muting pattern in the corresponding muting pattern group using a value of the third data field, and a step of determining a muting region using the determined muting pattern, but the method is not limited thereto.

The other steps of Steps S2310, 2320, and the like in FIG. 23 are the same as the corresponding steps in FIG. 17 described above. Therefore, the description thereof is omitted to avoid overlapping.

In addition, when the embodiment in FIG. 22 is applied, the configuration of CSI-RS muting information transmission apparatus is the same as the case in FIG. 18, but only the function of the muting information generating unit 1830 will be different a little bit.

That is, when the embodiment of FIG. 22 is applied, the muting information generating unit of the CSI-RS muting information transmission apparatus is to generate muting information that can indicate a muting region determined by the muting region determining unit. In more detail, as described in relation to FIGS. 2 to 15 and 22, the muting information generating unit may generate final muting information by generating and combining a first data field indicating the muting duty cycle and the muting offset, a second data field indicating muting pattern group information for one subframe, and a third data field indicating a specific muting pattern in the determined muting pattern group.

The first to third data field may be determined by a method of combining one or more of various types of the first step as described above and the second and third steps in the embodiment in FIG. 22, and the detailed description thereof is omitted to avoid overlapping.

As an example of muting information according to an embodiment of FIG. 22, it is assumed that a communication system to which the present embodiment is applied has conditions as follows.

1) A condition of the first step: a case where the muting offset is the same as the CSI-RS transmission offset of the serving cell (base station) (it is assumed that the offset is 3), the muting duty cycle is a multiple of a CSI-RS transmission cycle of the serving cell (base station), M=4, and signaling is separately performed with $\lceil \log_2 M \rceil = 2$ about how many bits the number of information bits configuring the first data field are. (as a result, this corresponds to Method 2-1 of the first step described above, 6 bits in total)

2) A condition of the second step: a case where the step is performed based on pattern group IDs, 5 CSI-RS patterns in total are defined when the number of CSI-RS antenna ports is 8, the muting pattern group is one of five types, and among the patterns, Pattern "b" (indicated by "001") is a muting pattern group. (corresponding to Method 2-1 of the second step described above, 3 bits in total)

3) A condition of the third step: a case where a UE of the serving cell does not know the correct muting pattern of the neighboring cell as an object of muting in advance, and the number of muting CSI-RS antenna ports is 8 (indicated by "000" 3 bits in total)

Figure 24:
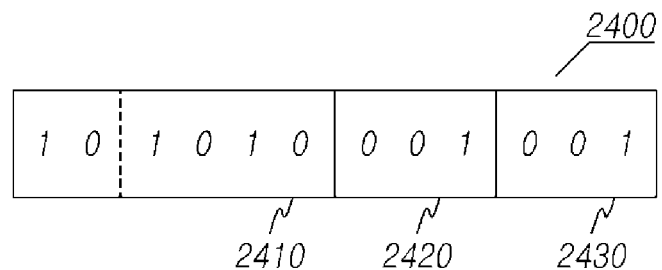
FIG. 24 illustrates an example of data format of muting information according to an embodiment of FIG. 22.

In this condition, the muting information may include a bit value of a first data field with 6 bits, and bit values of the second and third data field of 3 bits, respectively, and the muting information may be configured as in FIG. 24.

That is, FIG. 24 illustrates an example of data format of muting information according to an embodiment of FIG. 22.

If it is assumed that the conditions of the first to third steps described above are satisfied, the muting information 2400 according to the present embodiment includes a first data field region 2410 having 6 bits of "101010", a second data field region 2420 having 3 bits of "001", and a third data field region 2430 having 3 bits of "000".

The meaning of a value of each data field is described in detail as follows. The value of a first data field having 6 bits of "101010" may be divided into a 2-bit value ($\log_2 M=2$) of "10" indicating the number of configuration bits (M=4) and a 4-bit region of "1010" indicating an actual muting duty cycle and an muting offset.

As a result, the value of the first data field of "101010" has a muting duty cycle of 40 ms which is 4 times of a CSI-RS transmission cycle (10 ms) of the serving cell (serving cell), and indicates that muting subframes are present in the second and fourth CSI-RS transmission cycles. (if it is assumed that "0" means muting ON, and "1" means muting OFF) In addition, according to the condition of the first step, the muting offset is 3, so it means that the fourth subframe (the subframe number is 3) in the second and fourth CSI-RS transmission cycle is a muting subframe.

In addition, the value of the second data field of "001" indicates "b" which is a second pattern group among 5 CSI-RS patterns in total in FIG. 3 in which the number of CSI-RS antenna ports is 8. (if it is assumed that Pattern groups "a" to "e" are indicated by "000", "001", "010", "011", and "100".)

In addition, since the value of the third data field is "000", it means that the number of CSI-RS antenna ports is 8, and the final muting pattern is determined as Pattern "b" of FIG. 3, not FIGS. 4 to 5.

It is assumed that the muting information as in FIG. 24 is in consideration of only one neighboring cell, and if muting information is separately configured per each of two or more neighboring cells, the muting information may be generated with a value multiplied by the number N of the neighboring cells.

The configuration of a frame and a resource space indicating a state in which CSI-RSs of an actual serving cell are muted based on muting information of FIG. 24 is the same as FIG. 20 illustrated in relation to FIG. 19.

According to the muting information of FIG. 24, fourth subframes (the subframe number is 3) in the second and fourth CSI-RS transmission cycle are muting subframes, and in the resource spaces of the subframes, REs (which are indicated with dark shadows in FIG. 20) corresponding to Pattern "b" of FIG. 3 become muting regions, so muting which implies non-allocation of data and zero power transmission is performed in the regions. This is indicated with a frame configuration diagram as illustrated in FIG. 20.

In addition, though it is not illustrated, the configuration of channel state acquiring apparatus using muting information according to the embodiment of FIG. 22 is the same as FIG. 21. However, the only difference is that the muting information received from the serving cell configures the first to third data field described in relation to FIGS. 2 to 15 and 22.

In addition, the muting information receiver of the channel state acquiring apparatus using the muting information according to the embodiment of FIG. 22 receives muting information generated by the first to third steps described above, and the muting region identifying unit may include a step of confirming a subframe in which a muting region is present by identifying a muting duty cycle and a muting offset using a value of a first data field of the received muting information, a step of deciding a muting pattern group in the corresponding muting subframe using a value of a second data field in the corresponding muting subframe, a step of deciding a specific muting pattern in the corresponding muting pattern group using a value of a third data field, and a step of deciding a muting region using a determined muting pattern.

The other functions of channel state acquiring unit or the like are the same as described in relation to FIG. 21. Therefore, the detailed description thereof is omitted to avoid overlapping. The use of the embodiments described above provides an effect of providing simple and effective ways to reduce overhead to the maximum by configuring and transmitting signaling information on a part for performing muting in a resource space of a CSI-RS signal to be transmitted to each user equipment by a base station according to each circumstances, that is, muting information, in consideration of CSI-RS patterns of neighboring cells configuring multicells such as a CoMP set, the number of CSI-RS antenna ports of each of the neighboring cells, a muting duty cycle (period or cycle) in time/frequency, an offset, and the like.

In addition, there is an effect of allowing for correct CSI-RS decoding and therefore precisely performing channel state estimation since a serving cell in a multicell environment generates and transmits CSI-RSs of which regions overlapped with CSI-RSs of the neighboring cell are muted.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A method for transmitting Channel State Information-Reference Signal (CSI-RS) muting information to a user equipment by a specific cell, the method comprising:
   generating CSI-RS muting information including a first data field that indicates a cycle and an offset of muting subframes and a second data field having an n-bit bitmap, the n being an integer among 12 to 28, and each bit of the n-bit bitmap indicating whether to apply muting in the muting subframes;
   transmitting the CSI-RS muting information to the user equipment;
   mapping data to resource elements using the CSI-RS muting information, the mapping process including a muting for zero power transmission; and
   transmitting a signal including the mapped data to the user equipment.

2. The method as claimed in claim 1, further comprising:
   receiving CSI-RS information of a neighboring cell, the CSI-RS information of the neighboring cell including at least one of a CSI-RS pattern of the neighboring cell, the number of CSI-RS antenna ports of the neighboring cell, a CSI-RS transmission cycle (duty cycle) of the neighboring cell, CSI-RS transmission subframe offset information of the neighboring cell; and
   determining a muting region based on the CSI-RS information of the neighboring cell, the muting region configured to mute the CSI-RS pattern of the neighboring cell.

3. The method as claimed in claim 1, wherein the first data field is configured based on locations of the muting subframes to which the muting is applied and a relation between CSI-RS transmission cycles and CSI-RS transmission offset of the specific cell or the neighboring cell.

4. The method as claimed in claim 1, wherein each bit of the n-bit bitmap indicates whether to apply muting for resource elements corresponding to a CSI-RS pattern for a specific number of antenna ports.

5. The method as claimed in claim 1, wherein the second data field is configured as a 16-bit bitmap, each bit of the 16-bit bitmap indicating a CSI-RS pattern to be muted based on a specific number of antenna ports.

6. The method as claimed in claim 1, wherein the second data field indicates a muting pattern group comprising a muting pattern, the muting pattern group is configured based on a specific number of antenna ports, and resource regions that belong to the muting pattern group are muted based on a bit value of a bitmap of the second data field.

* * * * *